United States Patent
Bolinger

(10) Patent No.: US 11,641,930 B1
(45) Date of Patent: May 9, 2023

(54) COLLAPSIBLE BACKPACK SYSTEM

(71) Applicant: Christopher R Bolinger, Lancaster, PA (US)

(72) Inventor: Christopher R Bolinger, Lancaster, PA (US)

( * ) Notice: Subject to any disclaimer, the term of this patent is extended or adjusted under 35 U.S.C. 154(b) by 0 days.

(21) Appl. No.: 18/054,247

(22) Filed: Nov. 10, 2022

Related U.S. Application Data

(63) Continuation of application No. 17/933,654, filed on Sep. 20, 2022.

(60) Provisional application No. 63/323,391, filed on Mar. 24, 2022.

(51) Int. Cl.
*A45F 4/02* (2006.01)
*B62J 9/23* (2020.01)

(52) U.S. Cl.
CPC .. *A45F 4/02* (2013.01); *B62J 9/23* (2020.02)

(58) Field of Classification Search
CPC ...... A45F 4/02; A45F 3/04; A45F 3/08; B62J 9/05; B62B 1/20
See application file for complete search history.

(56) References Cited

U.S. PATENT DOCUMENTS

| | | | |
|---|---|---|---|
| 3,734,366 A | 5/1973 | Wood | |
| 3,786,972 A | 1/1974 | Alley | |
| 3,889,859 A * | 6/1975 | Joseph | A45F 3/08 224/636 |
| 3,899,109 A * | 8/1975 | Noice | A45F 3/10 224/262 |
| 4,433,802 A | 2/1984 | Woolf | |
| 4,438,876 A | 3/1984 | Ward | |
| 4,491,258 A | 1/1985 | Jones | |
| 4,979,658 A | 12/1990 | Baker | |
| 5,609,278 A | 3/1997 | Fresco | |
| 5,765,733 A | 6/1998 | Brule | |
| 5,890,640 A | 4/1999 | Thompson | |
| 5,904,282 A * | 5/1999 | Gleason | A45F 3/08 224/636 |
| 6,179,188 B1 * | 1/2001 | Gleason | A45F 3/047 224/641 |
| 7,232,048 B2 * | 6/2007 | Le Gal | A45F 3/08 224/634 |

(Continued)

FOREIGN PATENT DOCUMENTS

| | | |
|---|---|---|
| CA | 2316508 A1 | 2/2002 |
| CH | 203581 A | 3/1939 |

(Continued)

*Primary Examiner* — Brian D Nash
(74) *Attorney, Agent, or Firm* — Villamar & Guiliana LLP

(57) ABSTRACT

A frame for a collapsible and deployable backpack can include a plurality of struts and straps configured for carrying luggage. The struts can be attachable to form a backpack frame. The straps can be attachable to the struts for wearability. The luggage can be in the form of two or more independent pieces of luggage attachable to the frame, for example, two or more pannier bags. The frame can include upright struts bent into a bowed configuration. The bowed struts can be oriented in a splayed apart configuration to provide racking resistance. In a collapsed configuration, the backpack can have an overall width that is less than a pedal width of a bicycle, and optionally less than a width of a suspension portion of a bicycle.

11 Claims, 11 Drawing Sheets

(56) References Cited

U.S. PATENT DOCUMENTS

| | | | | |
|---|---|---|---|---|
| 7,490,358 B1* | 2/2009 | Beck | ............... | F41H 1/02 |
| | | | | 2/92 |
| 7,770,769 B2* | 8/2010 | Hurn | ............... | A45F 3/047 |
| | | | | 224/628 |
| 9,060,590 B2 | 6/2015 | Valesko | | |
| 9,271,560 B2 | 3/2016 | Buffinton | | |
| 9,848,687 B2* | 12/2017 | Valesko | ............ | A45F 3/047 |
| 10,618,587 B2 | 4/2020 | Easly | | |
| 11,363,877 B2* | 6/2022 | Wright | ............ | A45F 3/08 |
| 2006/0208024 A1* | 9/2006 | Gleason | ............ | A45F 3/08 |
| | | | | 224/636 |
| 2009/0015022 A1* | 1/2009 | Rome | ............ | F03G 5/00 |
| | | | | 290/1 A |
| 2010/0032464 A1* | 2/2010 | Gleason, Jr. | ........ | A45F 3/08 |
| | | | | 224/628 |
| 2013/0126564 A1* | 5/2013 | Savage, Sr. | ........ | A45F 4/02 |
| | | | | 224/155 |

FOREIGN PATENT DOCUMENTS

| | | |
|---|---|---|
| DE | 8614932 U1 | 7/1989 |
| DE | 29915653 U1 | 5/2000 |
| DE | 102011112614 A1 | 2/2013 |
| EP | 0748599 A1 | 12/1996 |
| EP | 1859703 A1 | 11/2007 |
| JP | 2010126148 A2 | 6/2010 |
| TW | 201103464 A | 2/2011 |
| WO | WO8911236 A1 | 11/1989 |

* cited by examiner

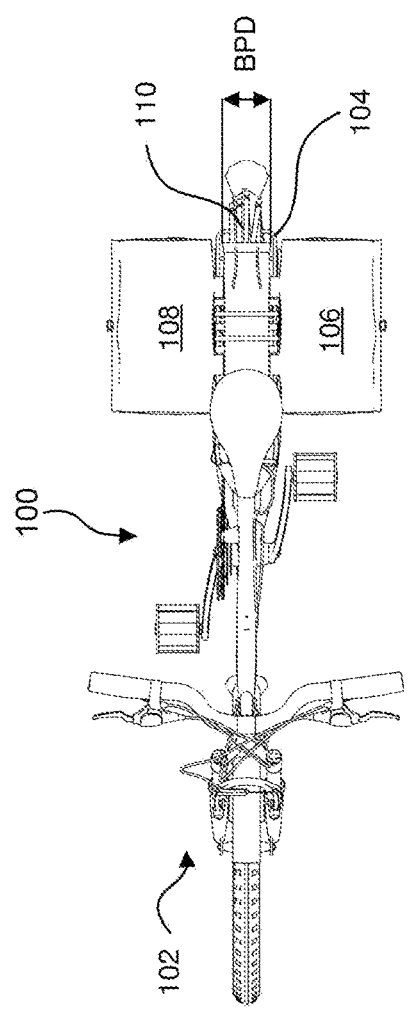
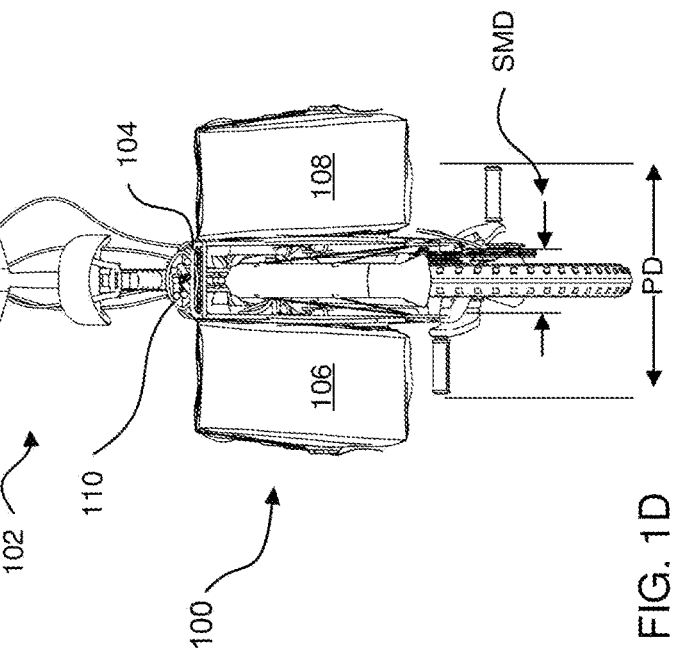
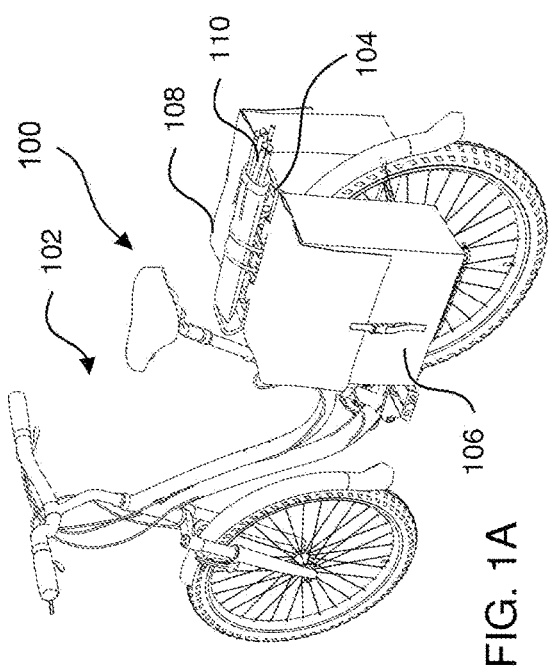
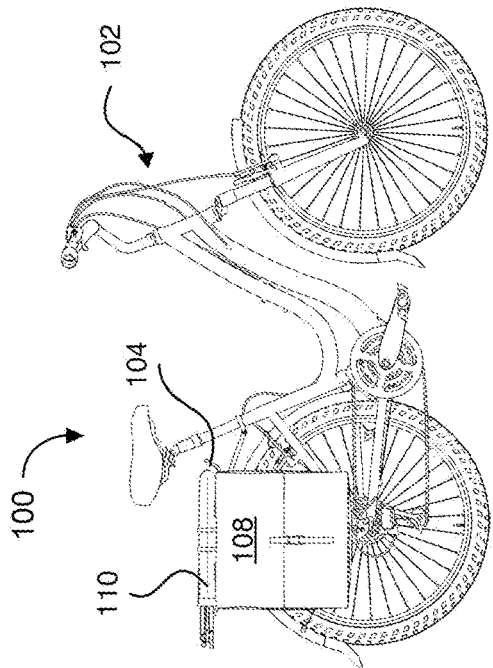
FIG. 1A
FIG. 1B
FIG. 1C
FIG. 1D

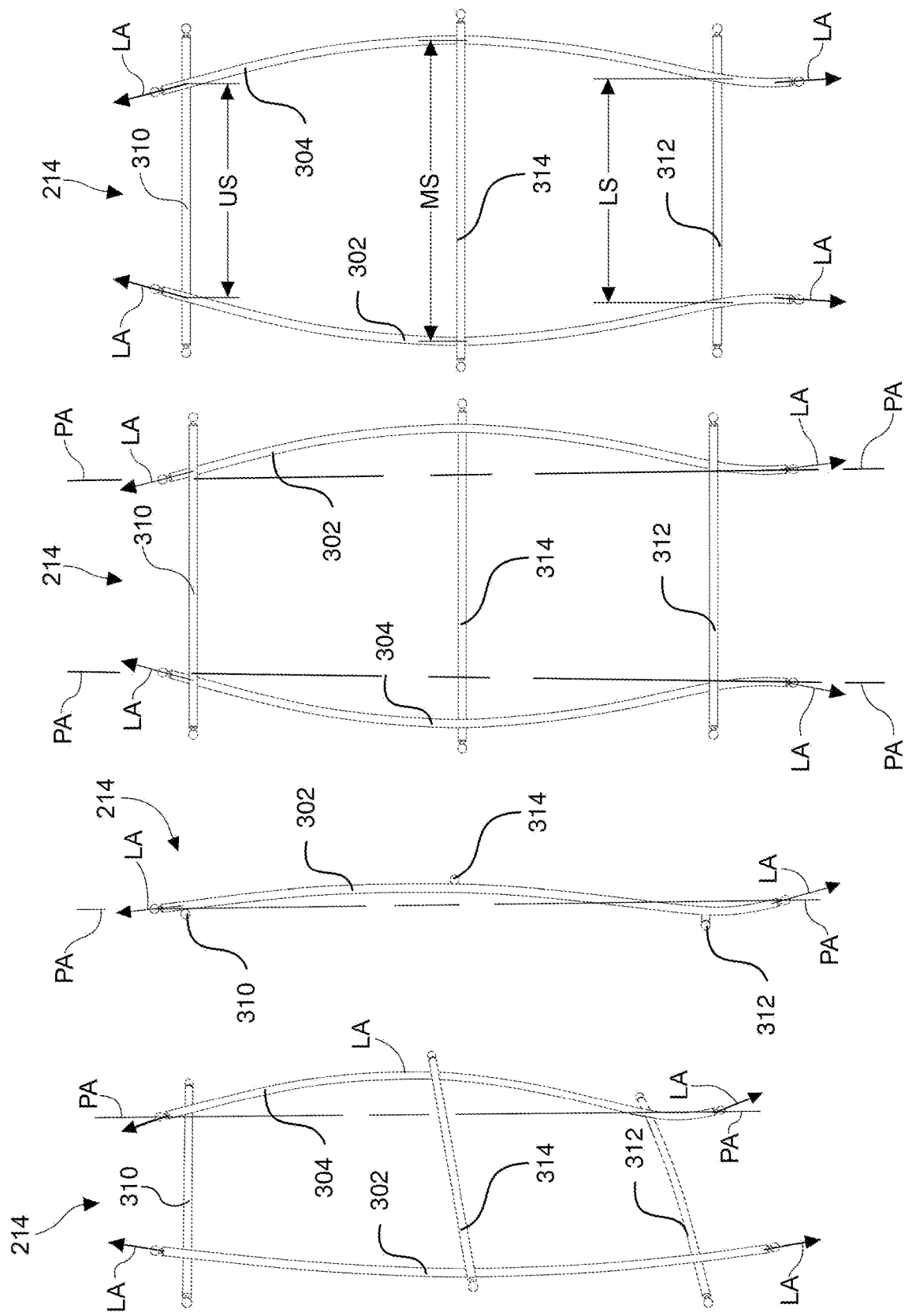

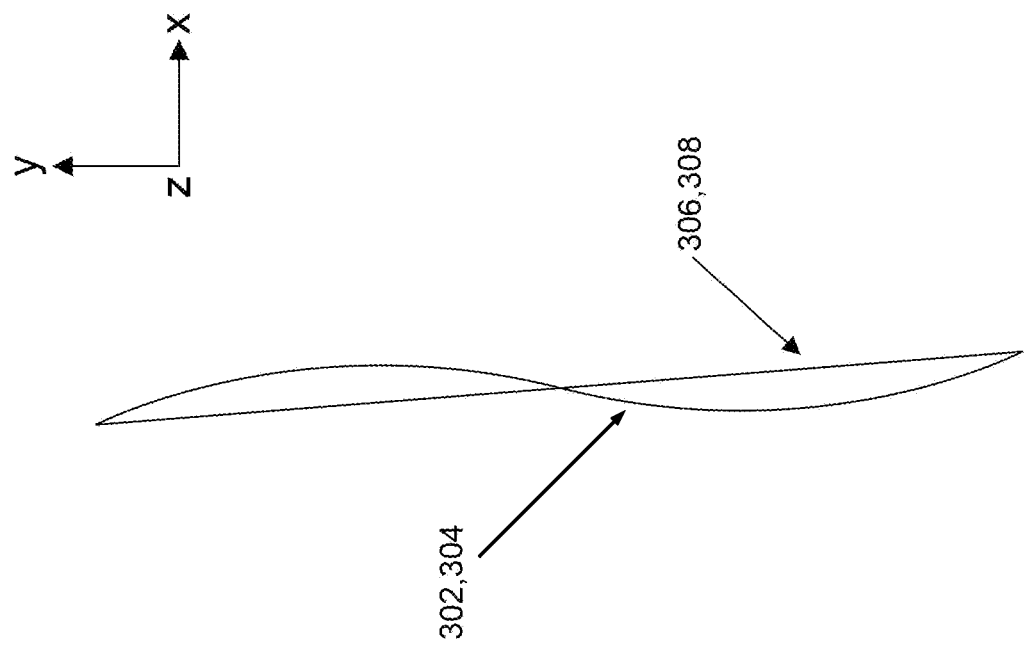
FIG. 10G
FIG. 10F
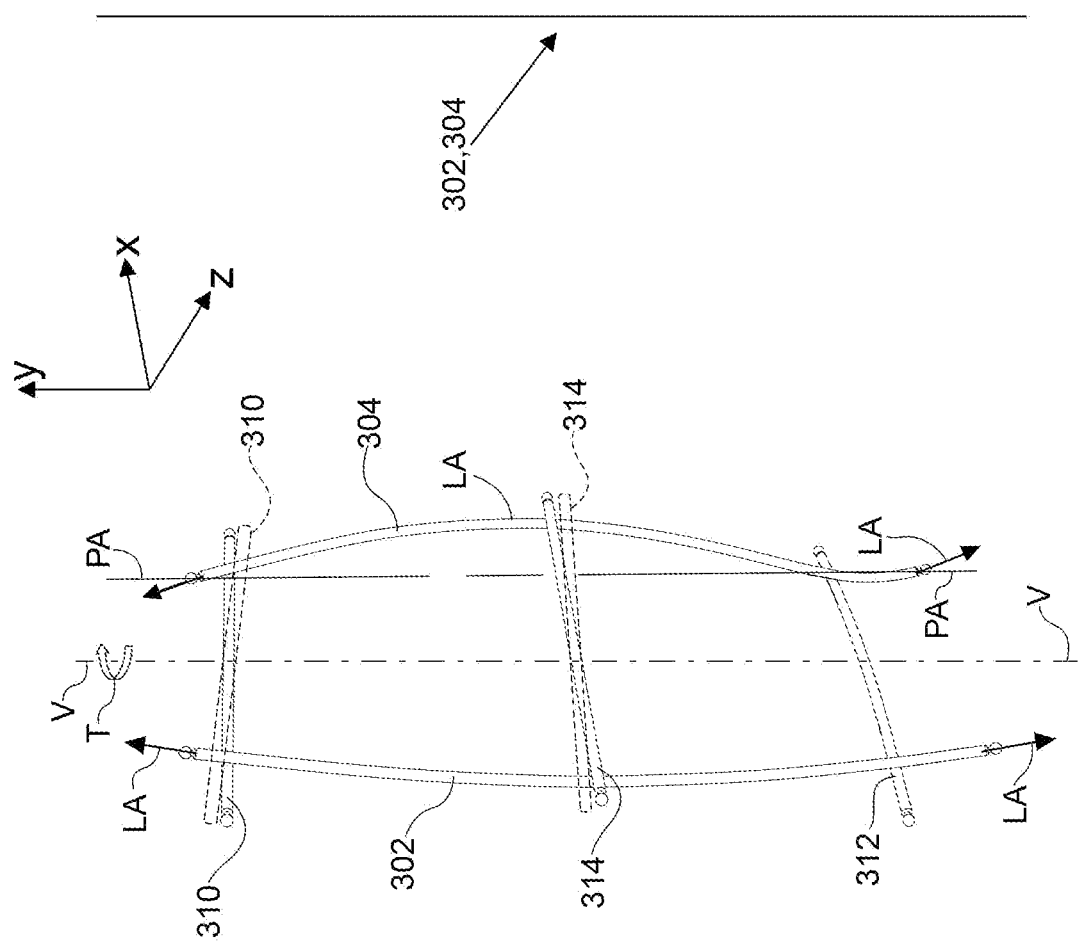
FIG. 10E

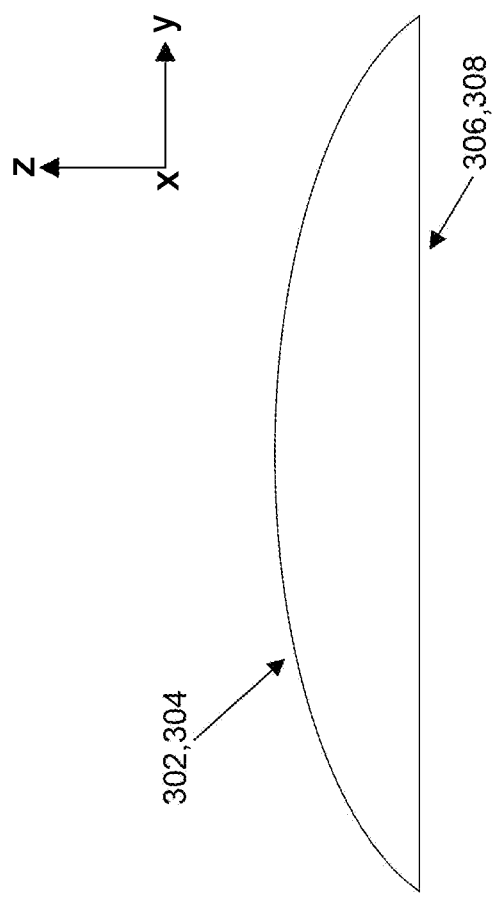
FIG. 10H
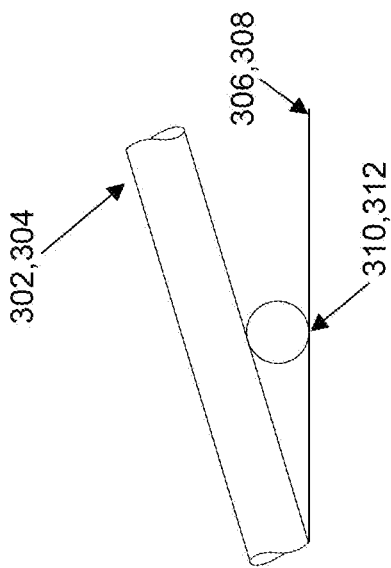
FIG. 10I
FIG. 10J
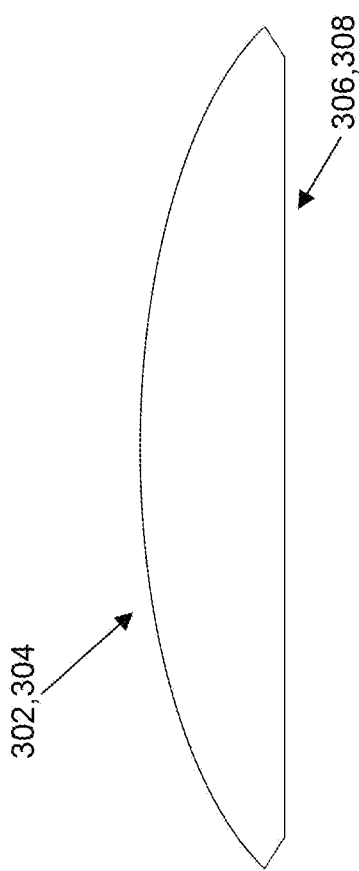
FIG. 10K
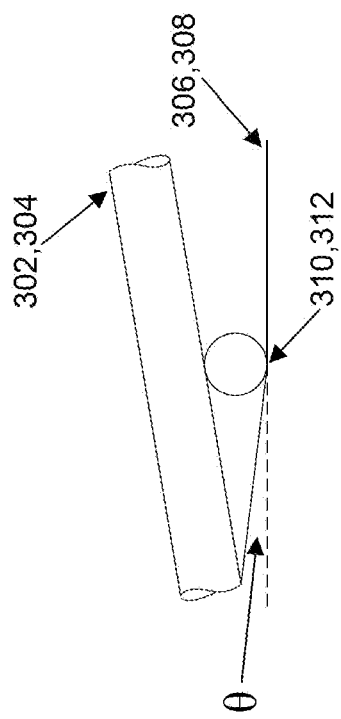

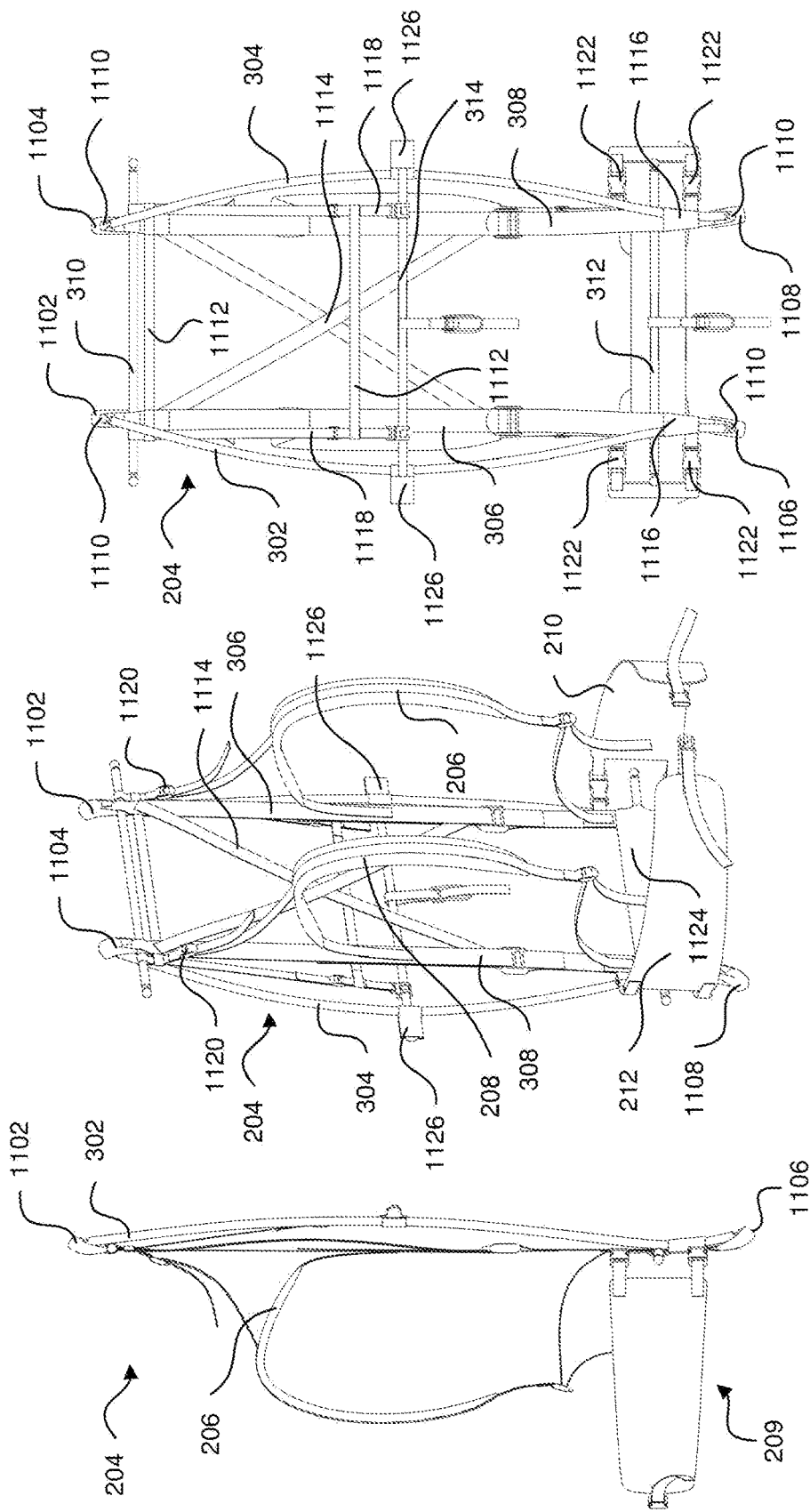

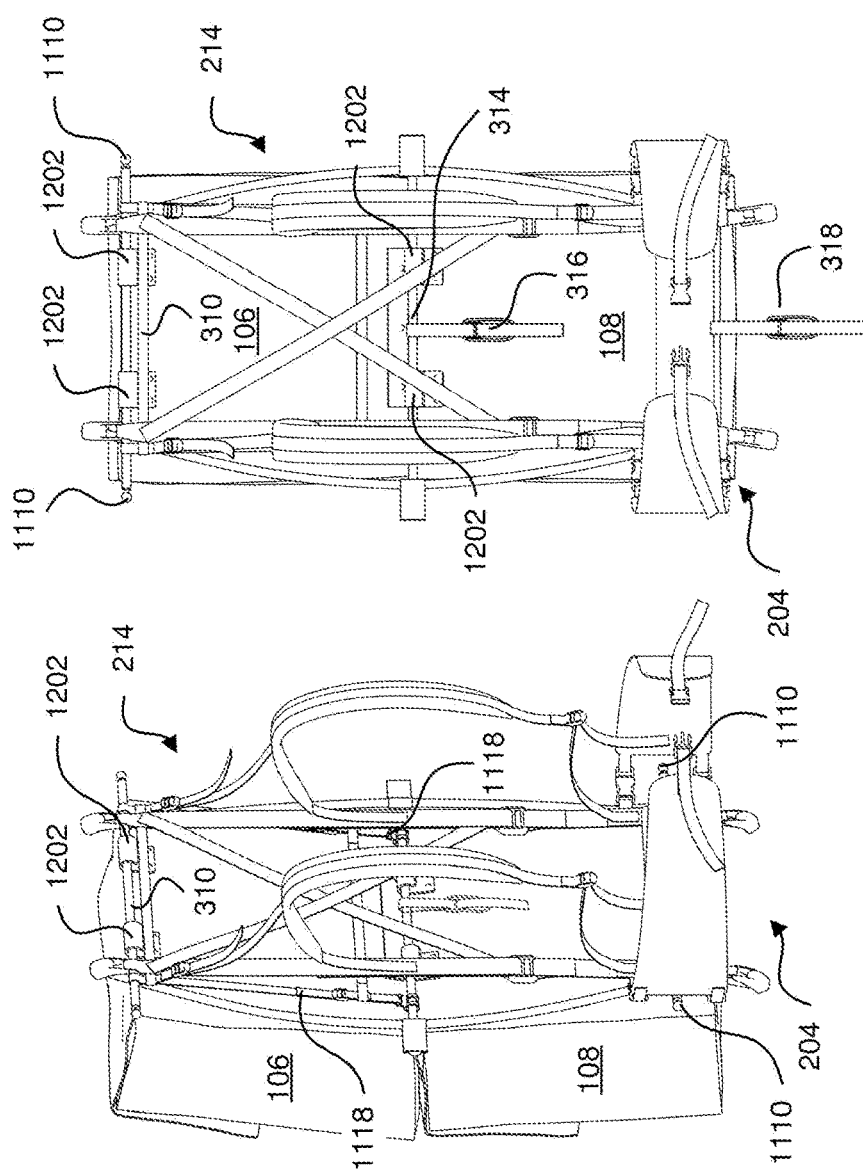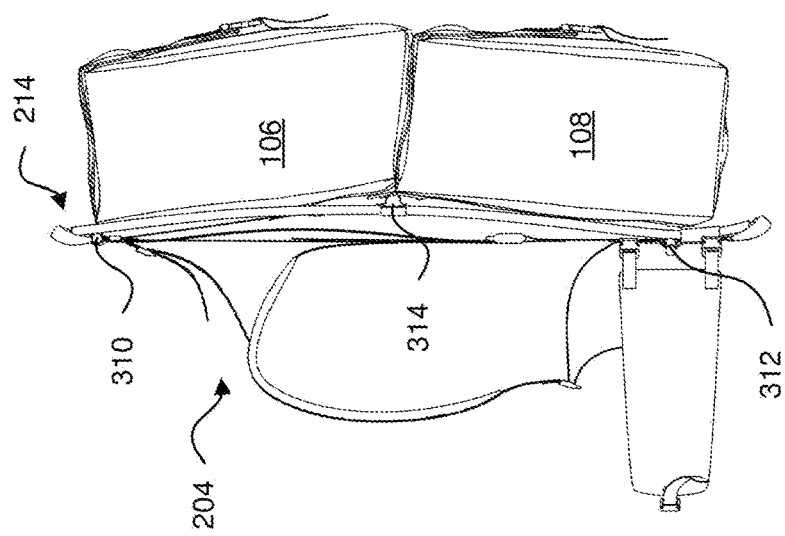
FIG. 12C   FIG. 12B   FIG. 12A

COLLAPSIBLE BACKPACK SYSTEM

BACKGROUND OF THE INVENTIONS

Field of the Inventions

The present inventions relate to backpacks, collapsible backpacks, backpack frames, and backpack systems for bicycles, for example but without limitation, which can be used to carry bicycle saddle bags, pannier bags or pieces of luggage.

Description of the Related Art

Various backpack and related systems have been developed, including for example, for carrying bags on bicycles, such as saddle bags, pannier bags, or pieces of luggage. In some such designs, a pannier rack is constructed so as to be mountable and removable from a bicycle and foldable into the shape of a backpack frame. Thus, a user could operate the bicycle with the pannier bags attached to the frame, then remove the frame from the bicycle and wear it as a backpack, with the pannier bags suspended therefrom.

SUMMARY OF THE INVENTIONS

An aspect of at least one of the inventions disclosed herein includes the realization that a collapsible and deployable backpack frame can be used to allow a user to remove pannier bags from a bicycle mounted rack and attach the pannier bags to the deployed backpack frame so as to facilitate carrying the pannier bags as a backpack, without removing the pannier rack from the bicycle.

Another aspect of at least one of the inventions disclosed herein includes the realization that pannier racks designed to be attachable to a bicycle frame are constructed in accordance with the structural requirements for use with bicycle, for example, straddling one of the suspension portions of the bicycle. Such an environment of use would require the pannier rack to have sufficient strength and rigidity appropriate for a bicycle luggage mount. Bicycles, for example, can be dropped or subject to impacts effected by the weight of the bicycle, the rider(s), and at a bicycle-operational speed, without suffering catastrophic damage. A backpack frame, by contrast, to be worn by a human user, would not be expected to withstand the same types of loads and impact scenarios as a bicycle-mounted pannier rack.

Thus, in some embodiments, a collapsible and deployable backpack frame system, and an associated method of use, can include a backpack frame assembly that can be collapsed and easily stored carrying by a bicycle and/or a rider of the bicycle. When deployed, such a collapsible backpack frame system can be used to carry the pannier bags. In this context of use, a rider can use the pannier bags, attached to a bicycle, for transporting luggage and/or equipment, and then deploy the collapsible backpack frame system so that the pannier bags can be removed and carried conveniently, in the form of a backpack. Optionally, such a collapsible backpack frame system can be lighter-weight than that typically associated with a pannier rack mounted to a bicycle. Also optionally, the collapsible backpack frame system can be collapsible into a configuration that is narrower than a fixed-width portion of an associated bicycle. For example, the collapsible backpack frame system can be collapsible into a width that is narrower than the overall pedal width of a bicycle. Further, in some embodiments, the collapsible backpack frame system can be configured to be collapsible into a width that is narrower than a suspension portion of the bicycle. As such, the collapsible backpack frame system, when collapsed, can be narrower than certain known pannier racks and thus be conveniently attached to and/or supported by the bicycle.

In some embodiments, a collapsible backpack and frame system includes a collapsible frame assembly and a collapsible carrying harness assembly configured to be deployable into a deployed state configured to be wearable as a backpack to which one or more pannier bags can be attached and supported for use. Additionally, the collapsible frame assembly and a collapsible carrying harness assembly can be collapsed into a configuration that is narrower than a fixed width portion of a bicycle to which the pannier bags can be attached. For example, in some embodiments, the collapsible frame assembly and a collapsible carrying harness assembly can be collapsed into a collapsed configuration with a width that is narrower than a pedal width or a suspension portion width of a bicycle.

Additionally, in some embodiments, a collapsible backpack and frame system can include a flexible collapsible carrying harness with shoulder and waist straps, and a collapsible frame assembly made from resilient upright and lateral frame members. Optionally, the frame members can be in the form of aluminum or fiberglass rods (also known as "tent poles"), and the like. The upright frame members can be held in a stressed condition, by straps of the carrying harness, so as to bend the upright frame members into a bowed-shape. Top and bottom lateral frame members can be attached to the carrying harness for providing top and bottom lateral support.

Another aspect of at least one of the inventions disclosed herein includes the realization that a backpack frame which includes bowed struts as structural members can benefit from a configuration in which the bowed struts are maintained in a splayed orientation, for example, pivoted toward each other or pivoted away from each other, so as to provide "racking" resistance. For example, in some embodiments, the backpack frame includes side by side, upright, bowed structural members and one or more transverse members which are used for supporting luggage devices, such as pannier bags. If the upright, bowed members are parallel, then they can be susceptible to racking, i.e., pivoting side-to-side, for example, when net lateral forces act on luggage and thus the backpack frame. However, if the upright members are oriented so as to be nonparallel, for example, splayed inwardly or apart, the resulting geometry provides an inherent resistance against a racking motion. As such, the backpack frame can be formed of lightweight and optionally resilient structural members yet provide a stable supporting structure for luggage in the form of a backpack.

In some aspects, the techniques described herein relate to a collapsible and deployable pannier bag system for carrying bicycle-mountable pannier bags with a collapsible backpack for supporting the pannier bags on a user, the pannier bag system including: a bicycle having a suspension portion having an overall suspension portion width, and a carrier rack including a first side portion and a second side portion, the carrier rack straddling the suspension portion; a first pannier bag and a second pannier bag removably attached to the first side portion and the second side portion, respectively; and a collapsible and deployable backpack removably attached to the carrier rack, the collapsible and deployable backpack, including: a first longitudinal frame strut, the first longitudinal frame strut including a first upper portion, a first upper end, a first lower portion, a first lower end, a first middle portion positioned between the first upper end and the first lower end, and a first longitudinal axis extending from the first upper end to the first lower end, a second longitudinal frame strut including a second upper portion, a second upper end, a second lower portion, a second lower end, and a second middle portion positioned between the second upper end and the second lower end, and a second longitudinal axis extending from the second upper end to the second lower end, at least a top lateral frame strut, a middle lateral frame strut and a bottom lateral frame strut, a carrying harness, including at least a first longitudinal strap and a second longitudinal strap, the first longitudinal strap having a first upper connector portion and a first lower connector portion, the second longitudinal strap having a second upper connector portion and a second lower connector portion, the first upper connector portion and the second upper connector portion configured to removably receive the first upper portion and the second upper portion, respectively, and the first lower connector portion and the second lower connector portion configured to receive the first lower portion and the second lower portion, respectively, the first longitudinal strap and the second longitudinal strap configured retain the first longitudinal frame strut and the second longitudinal frame strut, respectively, under stress in a bowed configuration, wherein the top lateral frame strut is configured to be removably connected to the first upper portion and the second upper portion, wherein the bottom lateral frame strut is configured to be removably connected to the first lower portion and the second lower portion, and wherein the middle lateral frame strut is configured to be removably connected to the first middle portion and the second middle portion so as to maintain the first longitudinal frame strut and the second longitudinal frame strut in a non-parallel, rotational orientations about the first longitudinal axis and the second longitudinal axis, respectively, differing by at least ten degrees such that the first middle portion and the second middle portion are spaced apart by a middle spacing that is greater than an upper spacing between the first upper portion and the second upper portion and greater than a lower spacing between the first lower portion and the second lower portion, so as to resist a racking movement of the first longitudinal frame strut and the second longitudinal frame strut, in use, wherein the top lateral frame strut and the middle lateral frame strut are configured to removably receive the first pannier bag and the second pannier bag, respectively, a belt strap removably attached to a bottom portion of the first longitudinal strap and the second longitudinal strap, at least two adjustable shoulder straps respectively attached to the first longitudinal strap and the second longitudinal strap, and a carrying bag configured to store the carrying harness along with the first longitudinal frame strut, the second longitudinal frame strut, the top lateral frame strut, the bottom lateral frame strut, and the middle lateral frame strut arranged generally parallel to each other in a collapsed configuration inside the carrying bag such that an overall bag width of the carrying bag is less than the overall suspension portion width of the suspension portion.

In some aspects, the techniques described herein relate to a collapsible and deployable pannier bag system, further including: a first bottom securement strap having a first end removably attached to the middle lateral frame strut, and a second end removably attached to a bottom portion of the first pannier bag for securing the first pannier bag to the carrying harness; and a second bottom securement strap having a first end removably attached to the bottom lateral frame strut, and a second end removably attached to a bottom portion of the second pannier bag for securing the second pannier bag to the carrying harness.

In some aspects, the techniques described herein relate to a collapsible and deployable pannier bag system, wherein the first longitudinal strap and the second longitudinal strap are configured to have an adjustable length such that an extent to which the first longitudinal frame strut and the second longitudinal frame strut are bowed can be adjusted.

In some aspects, the techniques described herein relate to a collapsible and deployable pannier bag system, wherein the middle lateral frame strut is configured to maintain the first longitudinal frame strut and the second longitudinal frame strut in a non-parallel orientation so as to resist the racking movement under a lateral load.

In some aspects, the techniques described herein relate to (Backpack with frame made of at least 2 upright bowed struts and three lateral struts for carrying 2 independent pieces of luggage) A collapsible and deployable backpack for carrying two independent pieces of luggage, including: a first longitudinal frame strut and a second longitudinal frame strut, an upper lateral frame strut, a middle lateral frame strut, a lower lateral frame strut, a carrying harness including a first longitudinal strap and a second longitudinal strap having an upper connector portion and a lower connector portion configured to removably receive respective upper and lower portions of the first longitudinal frame strut and the second longitudinal frame strut, the first longitudinal strap and the second longitudinal strap configured to maintain the first longitudinal frame strut and the second longitudinal frame strut in a bowed orientation, wherein the upper lateral frame strut is configured to be removably connected to respective upper portions of the first longitudinal frame strut and the second longitudinal frame strut and to support a first piece of luggage, wherein the lower lateral frame strut is configured to be removably connected to lower portions of the first longitudinal frame strut and the second longitudinal frame strut, and wherein the middle lateral frame strut is configured to be removably connected to middle portions of the first longitudinal frame strut and the second longitudinal frame strut and to support a second piece of luggage that is independent from the first piece of luggage, and at least two adjustable shoulder straps respectively attached to the first longitudinal strap and the second longitudinal strap.

In some aspects, the techniques described herein relate to a collapsible and deployable backpack, wherein the middle lateral frame strut is configured to maintain the first longitudinal frame strut and the second longitudinal frame strut in a non-parallel orientation so as to resist racking under a lateral load.

In some aspects, the techniques described herein relate to a collapsible and deployable backpack additionally including a belt strap removably attached to a bottom portion of the first longitudinal strap and the second longitudinal strap.

In some aspects, the techniques described herein relate to a collapsible and deployable backpack additionally including a carrying bag configured to store the first longitudinal frame strut, the second longitudinal frame strut, the upper lateral frame strut, the middle lateral frame strut, and the lower lateral frame strut and the carrying harness.

In some aspects, the techniques described herein relate to a collapsible and deployable backpack, in combination with a bicycle having a carrier rack and with the first piece of luggage and the second piece of luggage removably connectable to the carrier rack, wherein the first piece of luggage and the second piece of luggage are also removably connectable to a frame of the bicycle.

In some aspects, the techniques described herein relate to a collapsible and deployable backpack, additionally including: a first bottom securement strap having a first end removably attached to the middle lateral frame strut, and a second end removably attached to a bottom portion of the first piece of luggage for securing the first piece of luggage to the carrying harness; and a second bottom securement strap having a first end removably attached to the lower lateral frame strut, and a second end removably attached to a bottom portion of the second piece of luggage for securing the second piece of luggage to the carrying harness.

In some aspects, the techniques described herein relate to a collapsible and deployable backpack, wherein the middle lateral frame strut is configured to maintain the first longitudinal frame strut and the second longitudinal frame strut in an orientation tilted away from each other by at least 10 degrees.

In some aspects, the techniques described herein relate to a frame for a collapsible and deployable backpack, including: a frame having at least a first longitudinal frame strut and a second longitudinal frame strut, and a first lateral frame strut, each of the first longitudinal frame strut and the second longitudinal frame strut including an upper portion, a middle portion, and a lower portion; and a carrying harness including at least a first longitudinal strap and a second longitudinal strap each having an upper connector portion and a lower connector portion configured to removably receive respective upper and lower portions of the first longitudinal frame strut and the second longitudinal frame strut, the first longitudinal strap and the second longitudinal strap configured to be adjustable so as to cause the first longitudinal frame strut and the second longitudinal frame strut to bow under tension; wherein the first lateral frame strut is configured to be removably connected to respective middle portions of the first longitudinal frame strut and the second longitudinal frame strut so as to maintain the first longitudinal frame strut and the second longitudinal frame strut in a non-parallel orientation.

In some aspects, the techniques described herein relate to a frame for a collapsible and deployable backpack, additionally including a belt strap removably attached to a bottom portion of the first longitudinal strap and the second longitudinal strap.

In some aspects, the techniques described herein relate to a frame for a collapsible and deployable backpack, additionally including at least first and second adjustable shoulder straps respectively attached to the first longitudinal strap and the second longitudinal strap.

In some aspects, the techniques described herein relate to a frame for a collapsible and deployable backpack, additionally including a carrying bag configured to contain the frame and the carrying harness.

In some aspects, the techniques described herein relate to a frame for a collapsible and deployable backpack, wherein the first lateral frame strut is configured to maintain the first longitudinal frame strut and the second longitudinal frame strut in an orientation tilted away from each other by at least 10 degrees.

In some aspects, the techniques described herein relate to a frame for a collapsible and deployable backpack, additionally including an upper lateral frame strut positioned higher than the first lateral frame strut and a lower lateral frame strut positioned lower than the first lateral frame strut, wherein the upper lateral frame strut is configured to be removably connected between the upper portion of the first longitudinal frame strut and the upper portion of the second longitudinal frame strut, and wherein the lower lateral frame strut is configured to be removably connected between the lower portion of the first longitudinal frame strut and the lower portion of the second longitudinal frame strut.

In some aspects, the techniques described herein relate to a frame for a collapsible and deployable backpack, wherein the upper lateral frame strut is configured to support at least one piece of luggage and wherein the first lateral frame strut is configured to support at least another piece of luggage that is separate and independent from the at least one piece of luggage.

In some aspects, the techniques described herein relate to a frame for a collapsible and deployable backpack, in combination with a bicycle having a carrier rack and with the at least one piece of luggage and the at least another piece of luggage removably connectable to the carrier rack, wherein the at least one piece of luggage and the at least another piece of luggage are also removably connectable to a frame of the bicycle.

In some aspects, the techniques described herein relate to a frame for a collapsible and deployable backpack, further including: a first bottom securement strap having a first end removably attached to the first lateral frame strut, and a second end removably attached to a bottom portion of the at least one piece of luggage for securing the at least one piece of luggage to the carrying harness; and a lower bottom securement strap having a first end removably attached to the lower lateral frame strut, and a second end removably attached to a bottom portion of the at least another piece of luggage for securing the at least another piece of luggage to the carrying harness.

BRIEF DESCRIPTION OF THE DRAWINGS

FIG. 1A is a top, rear, and left side perspective view of a bicycle and pannier bag carrying system in accordance with an embodiment.

FIG. 1B is a right side elevational view of the bicycle pannier bag and carrying system illustrated in FIG. 1A.

FIG. 1C is a top plan view of the bicycle pannier bag carrying system illustrated in FIG. 1A.

FIG. 1D is a rear elevational view of the bicycle and pannier bag carrying system of FIG. 1A.

FIG. 5 is a right side and front perspective view of the structural portions of the frame that can be used with the collapsible and deployable backpack frame system of FIG. 3.

FIG. 6 is a right side elevational view of the frame assembly of FIG. 5.

FIG. 7 is rear elevational view of the frame assembly of FIG. 5.

FIG. 8 is a front elevational view of the frame assembly of FIG. 5.

FIG. 10E is a right side and front perspective view of the structural portions of the frame and illustrating, in phantom line, a deflection of the frame when subject to a torsional load, about the Y-axis.

FIG. 10F is a schematic view illustrating a shape of the longitudinal struts without any torsional load applied.

FIG. 10G is a schematic view illustrating a shape of the longitudinal struts with a torsional load applied.

FIG. 10H is a schematic side view of the longitudinal struts and connected straps, without any torsional load applied.

FIG. 10I is an enlarged schematic side view of an end of the longitudinal struts and connected straps of FIG. 10H, without any torsional load applied.

FIG. 10J is a schematic side view of the longitudinal struts and connected straps, with a torsional load applied.

FIG. 10K is an enlarged schematic side view of an end of the longitudinal struts and connected straps of FIG. 10J, with a torsional load applied.

FIG. 11A is a right side elevational view of the collapsible and deployable backpack frame system of FIG. 3 including a description of additional, optional features.

FIG. 11B is a rear and right side perspective view of the collapsible and deployable backpack frame system of FIG. 11A.

FIG. 11C is a front elevational view of the collapsible and deployable backpack frame system of FIG. 11A.

FIG. 12A is a right side elevational view of the collapsible and deployable backpack frame system of FIG. 11A, with two pannier bags attached thereto.

FIG. 12B is a left side perspective view of the collapsible and deployable backpack frame system of FIG. 12A.

FIG. 12C is a rear elevational view of the collapsible and deployable backpack frame system of FIG. 12A.

DETAILED DESCRIPTION OF THE PREFERRED EMBODIMENTS

Figure 2:
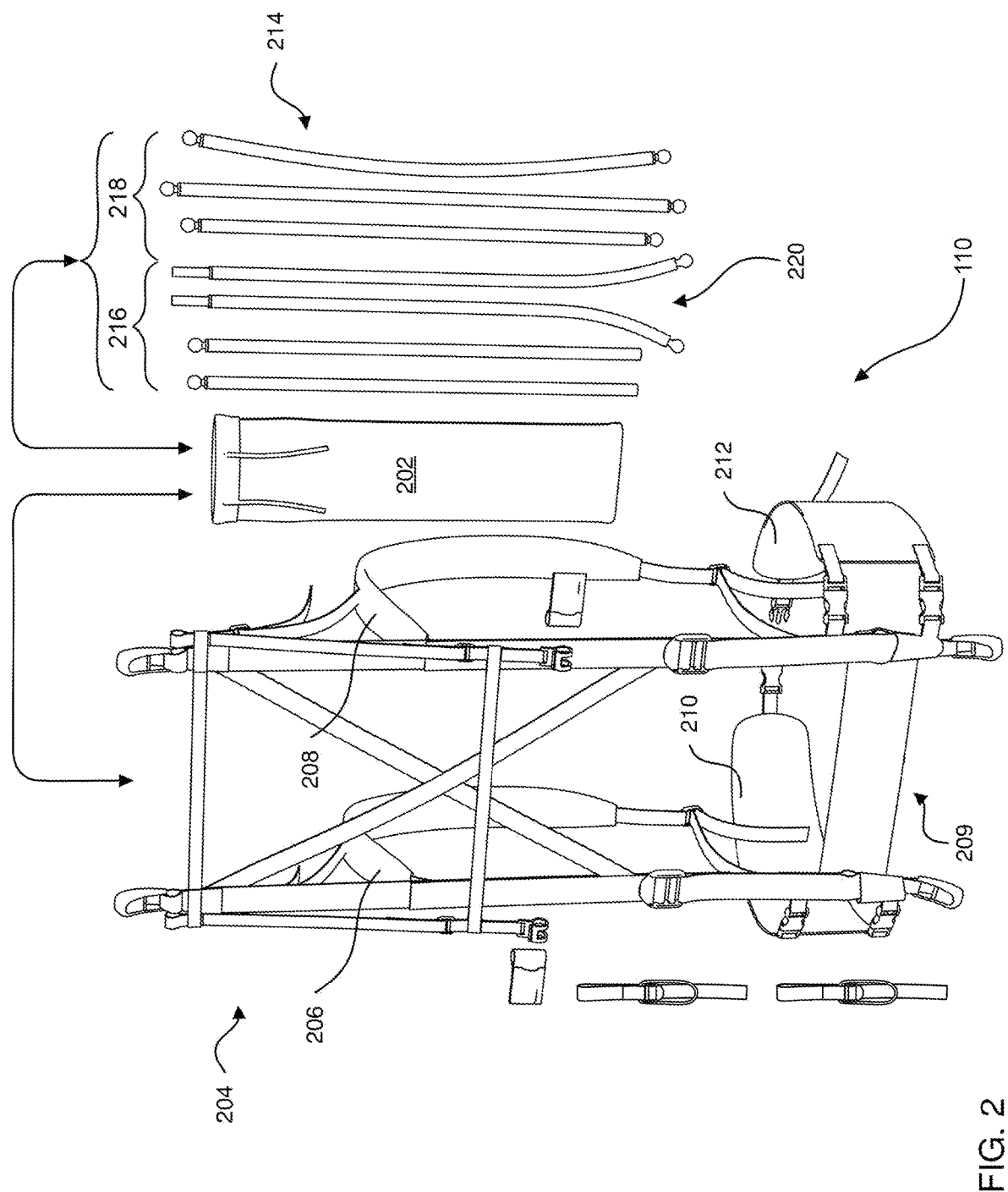
FIG. 2 is a perspective, exploded schematic view of a collapsible and deployable backpack frame system that can be used with the embodiment of FIG. 1, and illustrated in a partially exploded and unassembled state.

The following detailed description is merely illustrative in nature and is not intended to limit the embodiments of the subject matter or the application in uses of such embodiments. As used herein, the word "exemplary" means "serving as an example, instance or illustration" Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Certain terminology may be used in the following description for the purpose of reference only, and thus is not intended to be limiting. For example, terms such as "upper", "lower", "above", and "below" refer to directions in the drawings to which reference is made, and if indicated, can also refer to such directions during use or manufacture of the described embodiment. Terms such as "front", "back", "rear", and "side" describe the orientation and/or location of portions of the component within a consistent but arbitrary frame of reference which is made clear by reference to the text and the associated drawings describing a component. Such terminology may include the words specifically mentioned above, derivatives thereof, and words of similar import. Similarly, the terms "first", "second", and other such numerical terms referring to structures or methods do not indicate or require a limit on the number of permissible structures, or a required sequence or order unless expressly indicated or clearly implied by the context of the description.

The inventions disclosed herein are described in the context of bicycle saddle bag or pannier bag carrying systems. However, the inventions disclosed herein can be used in other contexts, as well, such as including, but without limitation, backpack systems, saddle or other bag carrying systems for vehicles other than bicycles, and the like.

Aspect of at least some of the inventions disclosed herein include a recognition that various systems have been developed for attaching bags to bicycles, such as saddle bags, pannier bags, and the like. Such known systems allow for the bags to be stolen when left unattended, are complicated to use and manufacture, and otherwise suffer from various other problems. Other known systems include pannier racks attachable to a bicycle for carrying pannier bags during operation of the bicycle and removable so as to be wearable as a backpack for carrying the pannier bags on a user's back.

For example, bike bag systems have been developed with a bicycle having a carrier rack for pannier bags to be removably attached thereto. When pannier bags are left a on the bicycle they can be easily stolen and are otherwise difficult to carry. Some integrated systems have been developed, wherein the pannier bags are combined with carrier racks, and the like, to be carried on a bicycle, and which convert into a backpack, so that the bags are not left on the bicycle.

An aspect of at least one of the inventions disclosed herein includes the realization that such systems are complex, bulky, and ill-suited to be worn by a human user due to the structural requirements for mounting to a bicycle, e.g., sufficient strength to withstand loads encountered during use when attached to a bicycle. For example, a rack attached to a portion of a bicycle would be designed in such a way as to withstand impacts that can occur during use of a bicycle, at operational bicycle speeds, with the weight of the bicycle itself, a user, and/or the weight of the luggage all effecting the potential damage caused by impacts. Such structural requirements are far greater than that necessary for a backpack to be worn by a human user.

Accordingly, in some embodiments, a collapsible and deployable backpack and frame system can be configured to be collapsible to be narrower than a pedal-to-pedal distance of a standard bicycle, and optionally, in some embodiments, making the system easy to transport on a carrier rack. Additionally, in some embodiments, a frame and harness of such a system can be configured to better resist side-to-side movement or "racking", and to accommodate conventional bike saddle bags, pannier bags, and the like.

With reference to the drawings, wherein like reference numerals designate identical or corresponding parts throughout the several views, and more particularly to FIGS. 1A, 1B, 1C and 1D thereof, there is illustrated perspective, top plan, side elevation and rear elevation schematic views of a bicycle saddle bag or pannier bag carrying system in accordance with an embodiment. As shown in FIGS. 1A-1D, a bicycle and pannier bag backpack system 100 can include a bicycle 102, carrier rack 104, pannier bags 106, 108 attached to the carrier rack 104, and a frame assembly 214 that can be considered as serving as a collapsible and deployable backpack frame assembly. The pannier bags 106, 108 can be considered, in some embodiments, as being two, bicycle-mountable, separate, independent pieces of luggage. The carrier rack 104 can straddle a suspension portion 114 of the bicycle 102. For example, the bicycle 102 can include a suspension portion connected to the front or rear tire of the bicycle 102. In some embodiments, the suspension portion herein is a rear suspension portion of the bicycle 102 which includes a plurality of frame portions connected to one or both sides of the rear tire. The suspension portion of the bicycle 102 can be considered as having a suspension portion width SMD (FIG. 1D). Additionally, the pedals of the bicycle 102 can be considered as defining a pedal-to-pedal width PD (FIG. 1D).

In some embodiments, the carrier rack 104 can be mounted to the bicycle 102 so as to straddle the rear portion of the bicycle 102, for example, straddling the rear suspension portion of the bicycle 102. As such, the pannier bags 106, 108 can be attached to the sides of the carrier rack 104, respectively, and thus be supported in positions adjacent to the sides of the rear tire of the bicycle 102. The pannier bags 106, 108 can include connectors (not shown) removably attached to respective sides of the carrier rack 104. In some embodiments, the carrier rack 104 and pannier bags 106, 108 can be of any known or commercially available design.

Optionally, the collapsible and deployable backpack and frame system 110 can be supported on the bicycle 102, for example but without limitation, on the carrier rack 104. FIGS. 1A-1D show the collapsible and deployable backpack and frame system 110 in a collapsed state, with all components held in a bag. In such a collapsed and bagged state, the collapsible and deployable backpack and frame system 110 can be considered as having a width BPD. Optionally, as shown in FIGS. 1C-1D, the width BPD of the collapsible and deployable backpack and frame system 110 can be less than an overall pedal-to-pedal distance or width PD of the bicycle 102. Further, in some embodiments, the width BPD can be less than the overall suspension portion width SMD of the bicycle 102.

FIG. 2 is a perspective, exploded, and schematic view of the collapsible and deployable backpack and frame system 110 of FIG. 1 in an unassembled condition in accordance with an embodiment. In FIG. 2, the collapsible and deployable backpack and frame system 110 can include a carrying bag 202, a carrying harness 204, and a frame assembly 214. In some embodiments, the carrying bag 202 can be used to store some or all of components of the collapsible and deployable backpack and frame system 110. In some embodiments, the carrying harness 204 can be flexible and collapsible with respective left and right adjustable shoulder straps 206 and 208, and a hip belt assembly 209 with respective left and right, adjustable, and removable waist straps 210 and 212. In some embodiments, the carrying harness 204 can be made with conventional webbing, straps, padded straps, and such conventional materials commonly used for commercially available backpack components.

The frame assembly 214 can include longitudinal and lateral frame members (or "struts") 216 and 218, such as aluminum rods or tent poles, fiberglass rods or tent poles, and the like. The structural members forming the frame assembly, including the longitudinal and lateral frame members 216, 218, in some embodiments, can be resilient, for example, in the form of structural components commonly referred to as "tent poles" and commercially available from various suppliers including DAC (Korea) under the commercial names Featherlight NSL, Featherlight NFL, Featherlight, Press Fit, PL, and DA17. Other types of frame members can also be used as the frame members 216, 218. The longitudinal frame members 216, optionally, can include short, curved portions 220 at bottom portions thereof which can be shaped to provide enhanced ergonomics. Additionally, any of the frame members 216, 218 can be made from a single piece or from multiple, separate pieces that are connectable, for example, using joint designs commonly used in the commercially available tent pole products such as those described above. Other types of joints can also be used.

Figure 3:
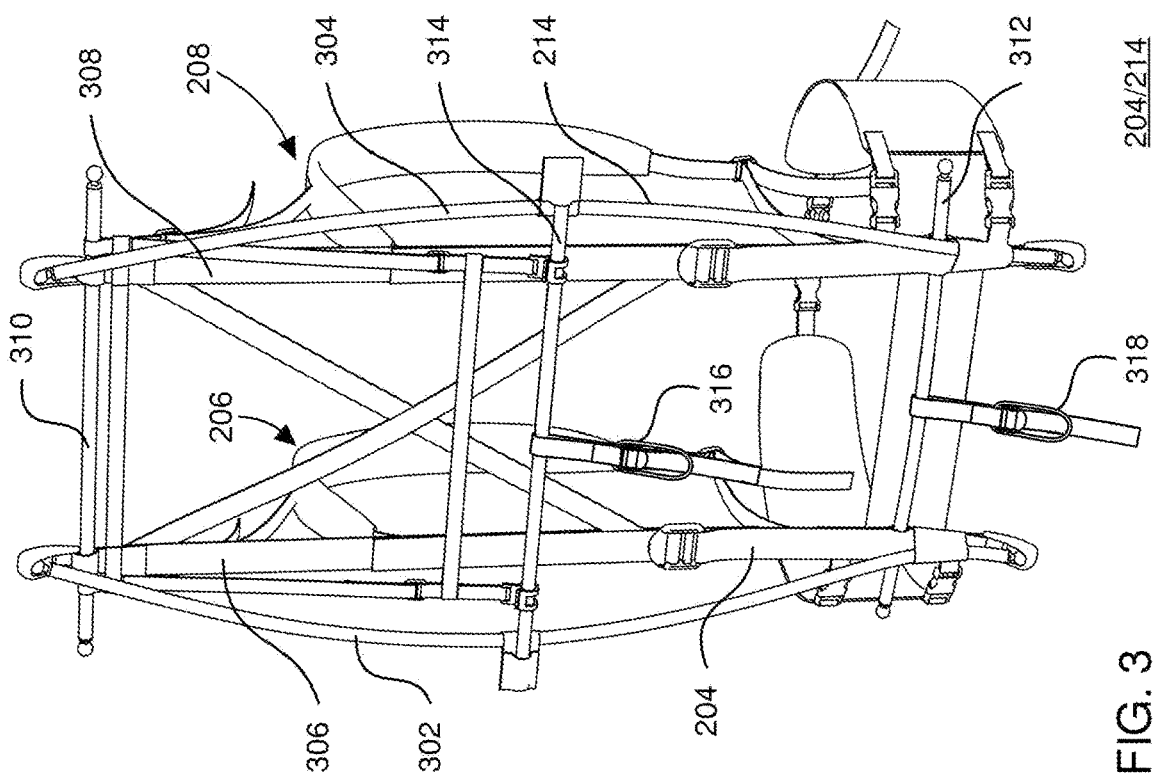
FIG. 3 is a perspective schematic view of the collapsible and deployable backpack frame system of FIG. 2 in a deployed condition in accordance with an embodiment.

FIG. 3 is a perspective, schematic view of the collapsible and deployable backpack and frame system 110 of FIG. 1 in a deployed condition in accordance with an embodiment. In FIG. 3, the longitudinal frame members 216 of FIG. 2 are shown assembled to form left and right longitudinal struts 302 and 304. The longitudinal struts 302 and 304 are held under tension by respective adjustable straps 306 and 308 of the carrying harness 204, so as to retain the longitudinal struts 302 and 304 in a bent or "bowed" shape.

For example, the straps 306, 308 can include connectors (discussed in greater detail below with reference to FIGS. 11A-11C) which capture the upper and lower ends of the longitudinal struts 302, 304 and maintain the upper and lower ends of the longitudinal struts 302 and 304 at a distance that is shorter than the distance between the upper and lower ends of the longitudinal struts 302, 304, when they are in a relaxed state. Thus, by attaching the straps 306, 308 to the longitudinal struts 302, 304, respectively, as such, the straps maintain the longitudinal struts 302, 304 in a stressed, bowed configuration the straps 306, 308. As such, the longitudinal struts 302, 304 are resiliently bent, for example, into the orientation and shape illustrated in FIG. 3. This resilient bending and bowing of the longitudinal struts 302, 304 maintain tension in the straps 306, 308. As such, the straps 306, 308 can serve as surfaces against which a user's back would be pressed during use. Optionally, the straps 306, 308, maintained under tension as such, can provide the dual benefits of serving a structural part of the overall assembly as well as a conforming and thus comfortable support surface which is pressed against a user's back, in use, described in greater detail below with reference to FIG. 4.

As shown in FIG. 3, the plurality of lateral frame members 218 of FIG. 2 can include top, bottom, and middle lateral frame members 310, 312, 314, all of which can be referred to as "struts". The top and bottom lateral frame members 310 and 312 can be removably attached to the carrying harness 204 for providing top and bottom lateral support for the frame assembly 214. The middle lateral frame member 314 can be removably attached, and optionally adjustably attached, between the longitudinal struts 302 and 304. Optionally, the sizing and/or connection between the middle lateral frame member 314 and the longitudinal struts 302, 304 can be configured to maintain the longitudinal struts 302 and 304 in a splayed-apart orientation, or splayed inwardly (described below with reference to FIG. 10D).

For example, as shown in FIGS. 5, 6, and 7, in the splayed apart orientation, the longitudinal axes LA of the longitudinal struts 302, 304 are nonparallel. However, the pivot axes PA of each of the longitudinal struts 302, 304 can be generally parallel. By maintaining the middle portions of the longitudinal struts 302, 304 in the spaced apart configuration, the frame assembly 214 better resists a "racking" movement, in use. For example, when the first and second panier bags 106 and 108 of FIG. 1 are mounted on the top and middle lateral frame members 310, 314 respectively, lateral loads such as that generated by the mass of the pannier bag 108 to the middle lateral frame member 314, can tend to cause the longitudinal struts 302, 304 to pivot about the pivot axes PA. An aspect of at least one of the inventions disclosed herein includes the realization that by maintaining the longitudinal struts 302, 304 in an orientation in which they are respective longitudinal axes LA are not parallel, for example, where middle portions of the longitudinal struts 302, 304 are either spaced further apart or closer together than their respective upper and lower ends, a racking motion can be better resisted, described in greater detail below with reference to FIGS. 9-10C.

Optionally, the carrying harness 204 also includes straps 316 and 318 removably connected to the middle and bottom lateral frame members 314 and 312. The straps 316 and 318 can be configured to attach to portions of the pannier bags 106 and 108, for example, for preventing the pannier bags 106 and 108 from swinging during use. Optionally, the straps 316 and 318 can be adjustable. Other types of devices, connectors or straps can also be used.

Figure 4:
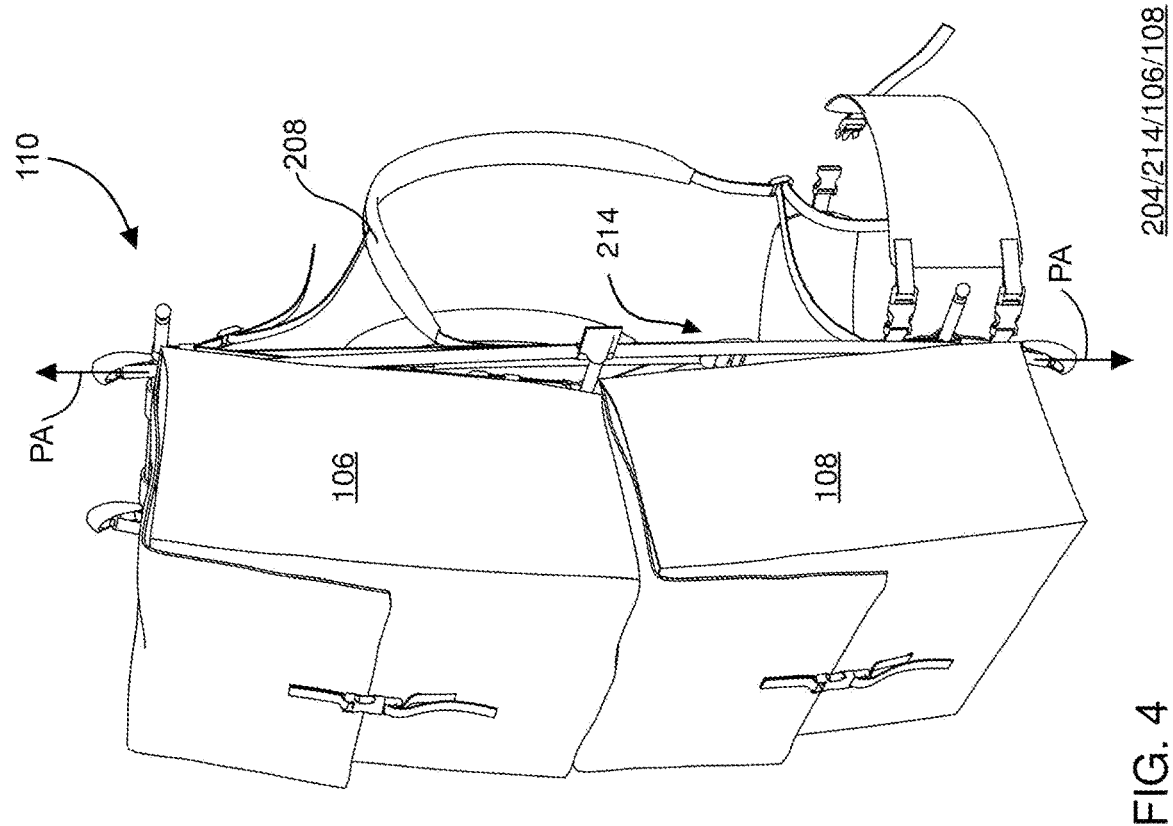
FIG. 4 is a perspective schematic view of the collapsible and deployable backpack frame system of FIG. 3 in a deployed condition and with pannier bags removably attached thereto in accordance with an embodiment.

FIG. 4 is a perspective schematic view of the collapsible and deployable backpack and frame system 110 of FIG. 1 in a deployed condition and with pannier bags 106, 108 attached thereto in accordance with an embodiment. In FIG. 4, the assembled system 110 is shown including the pannier bags 106 and 108 secured to the frame assembly 214 and the carrying harness 204. Disassembly is performed by working backwards from the steps described with respect to FIGS. 4 to FIGS. 1A-1C, completing the process.

Advantageously, the frame assembly 214 can simply and securely carry one or more of the pannier bags 106 and 108, but also is capable of carrying a roll-top dry bag, as well as bags, packs, loads, and the like, of many other forms. As previously described, the system 110 includes the carrying harness 204 with the shoulder straps 206 and 208, and the detachable hip belt assembly 209, and the longitudinal frame members 216 and the lateral frame members 218.

As noted above, the longitudinal struts 302, 304, being stressed in the bowed configuration, maintain tension in the straps 306, 308. As such, the straps 306, 308 provide a flexible and more comfortable and/or conforming surface against which is pressed against a user's back in use. For example, when a user wears the system 110 with the shoulder straps 206, 208 extending over the user's respective shoulders, the straps 306, 308 rest against the user's back and the longitudinal struts 302, 304 (which can be considered as serving as "upright frame members") are maintained in a position spaced apart from the user's back, thereby providing a comfortable experience for the user.

Additionally, the lower lateral frame member 312 is spaced from the user's lower back with padding and is thus comfortably stabilized across the user's lower back. As such, the lower end of the system 110 is stabilized against the user's back with the lower lateral frame member 312 and the associated padding and the upper portion of the system 110 is stabilized by the shoulder straps 206, 208 and the tensioned straps 306, 308.

FIGS. 5-8 are perspective, side elevation, front elevation and rear elevation schematic views of a frame assembly for the collapsible and deployable backpack and frame system 110 of FIG. 1, in a deployed condition in accordance with an embodiment. In FIGS. 5-8, the frame assembly 214 is illustrated with only the structural struts 302, 304, 310, 312, 314, with no connectors or other components illustrated, for purposes of explaining the interaction of the structural members, in use when attached to the carrying harness 204, which is not illustrated in FIGS. 5-8.

As shown in FIGS. 5-8, the longitudinal struts 302 and 304, which can be considered as having contoured longitudinal axes LA extending along the longitudinal lengths thereof, when in the bowed state, are generally S-shaped due to the bowed shape caused by the connection to the carrying harness 204 and the recurved portion at the lower ends of the longitudinal struts 302, 304. Additionally, the longitudinal struts 302, 304 can be considered as being pivotable about the pivot axes PA that extend between the upper and lower ends of the longitudinal struts 302, 304.

The top and bottom lateral frame members 310 and 312 can provide lateral support. Additionally, the middle lateral frame member 314 maintains the longitudinal struts 302 and 304 in a configuration in which middle portions thereof are spaced further away than the upper and lower ends, in a non-parallel, rotational orientation about the pivot axes PA. Optionally, this configuration can help prevent side-to-side movement or racking under load of the frame assembly 214, as further described in FIGS. 9-10C. Accordingly, the longitudinal struts 302 and 304 are spaced apart at a middle portion thereof by the middle lateral frame member 314 with a middle spacing MS (FIG. 8) that is greater than an upper spacing US and a lower spacing LS maintained by the top lateral frame member 310 and the bottom lateral frame member 312, respectively as shown in FIG. 8.

Figure 9:
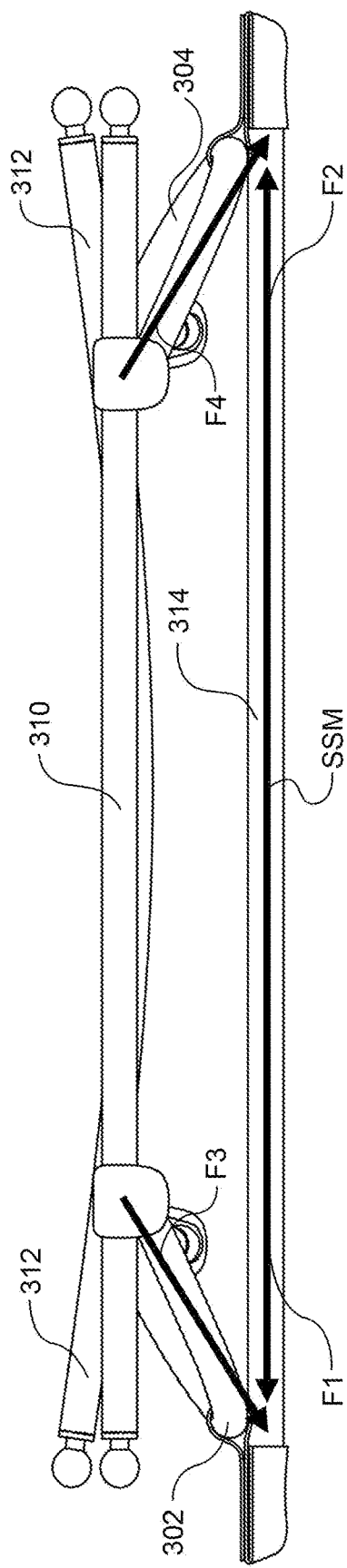
FIG. 9 is a top plan view of portions of the collapsible and deployable backpack frame system of FIG. 3 with certain components removed.
Figure 10A:
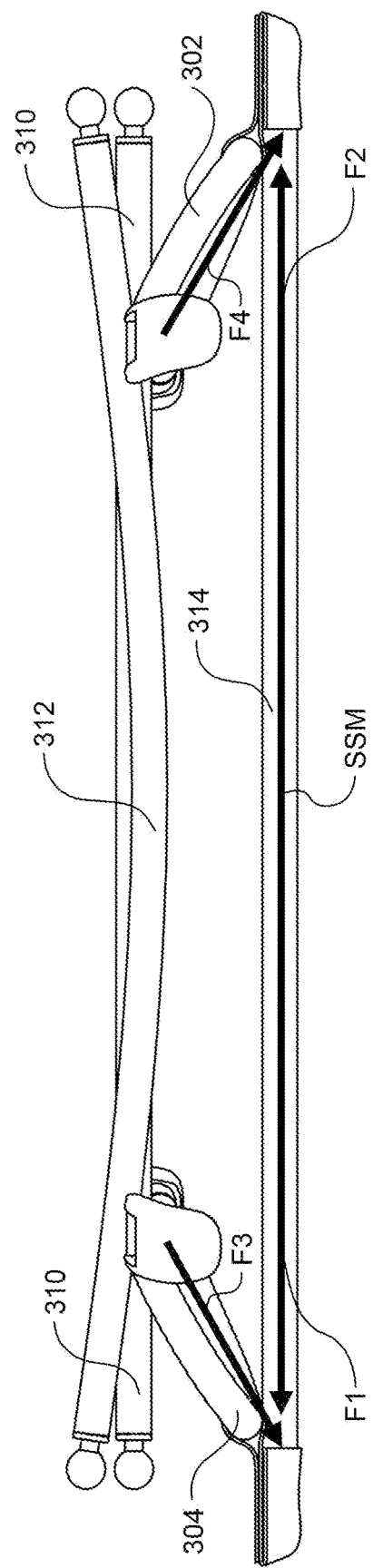
FIG. 10A is a bottom plan view of the portion of the collapsible and deployable backpack frame system of FIG. 9.

FIGS. 9-10 are top plan and bottom plan schematic views of the frame assembly for the collapsible and deployable backpack and frame system 110 of FIG. 1 in a deployed condition, illustrating an optional anti-racking feature in accordance with an embodiment. In FIGS. 9 and 10A, side-to-side movement SSM or "racking" causes corresponding forces F1 and F2 that are compensated by respective forces F3 and F4 based on the configuration of the longitudinal struts 302 and 304, as supported by the top and bottom lateral frame members 310 and 312, and as stabilized by the middle lateral frame member 314. In some embodiments, the middle lateral frame member 314 can maintain the longitudinal struts 302, 304 in an orientation tilted away from each other by at least 10 degrees or more.

Figure 10B:
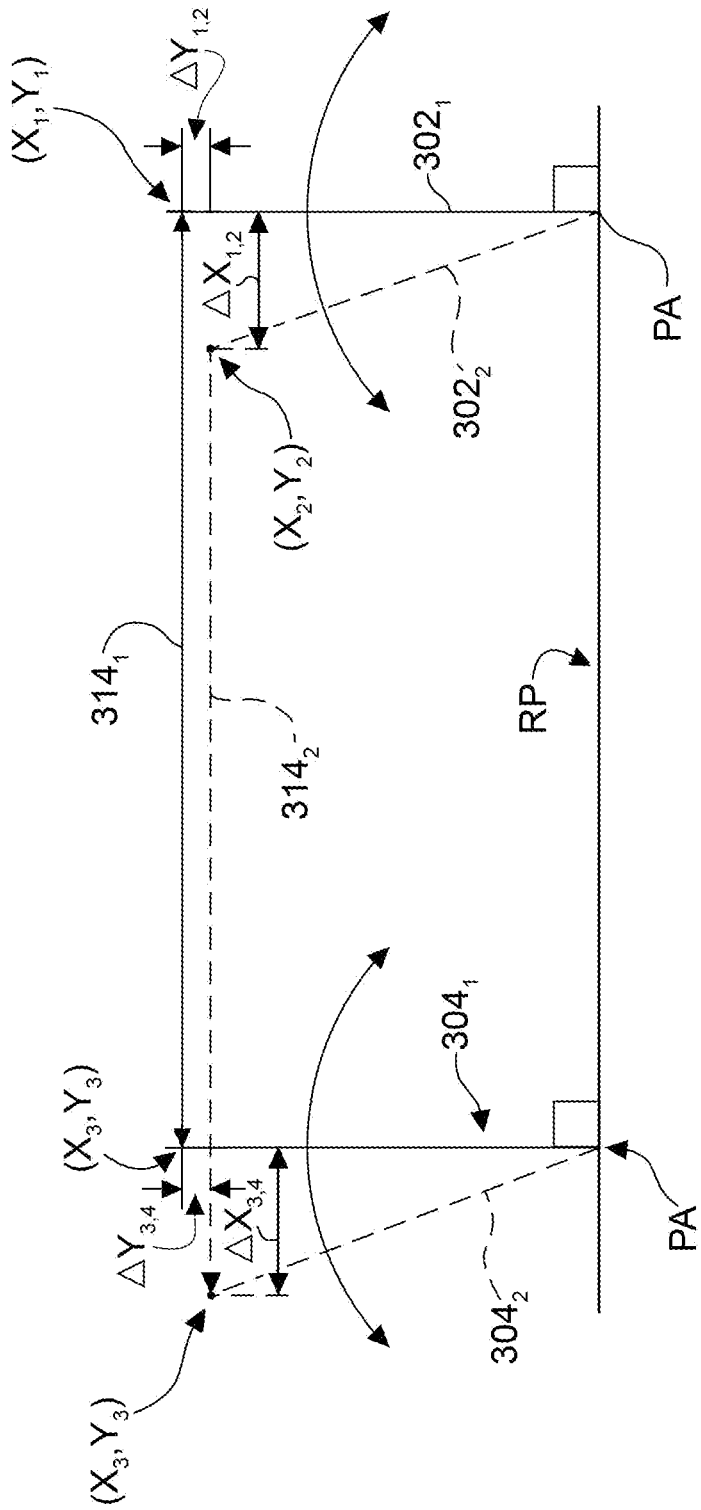
FIG. 10B is a schematic top plan view of an optional configuration of certain structural members of the frame assembly of FIG. 5 for illustrating an incremental racking movement.
Figures 10C, 10D:
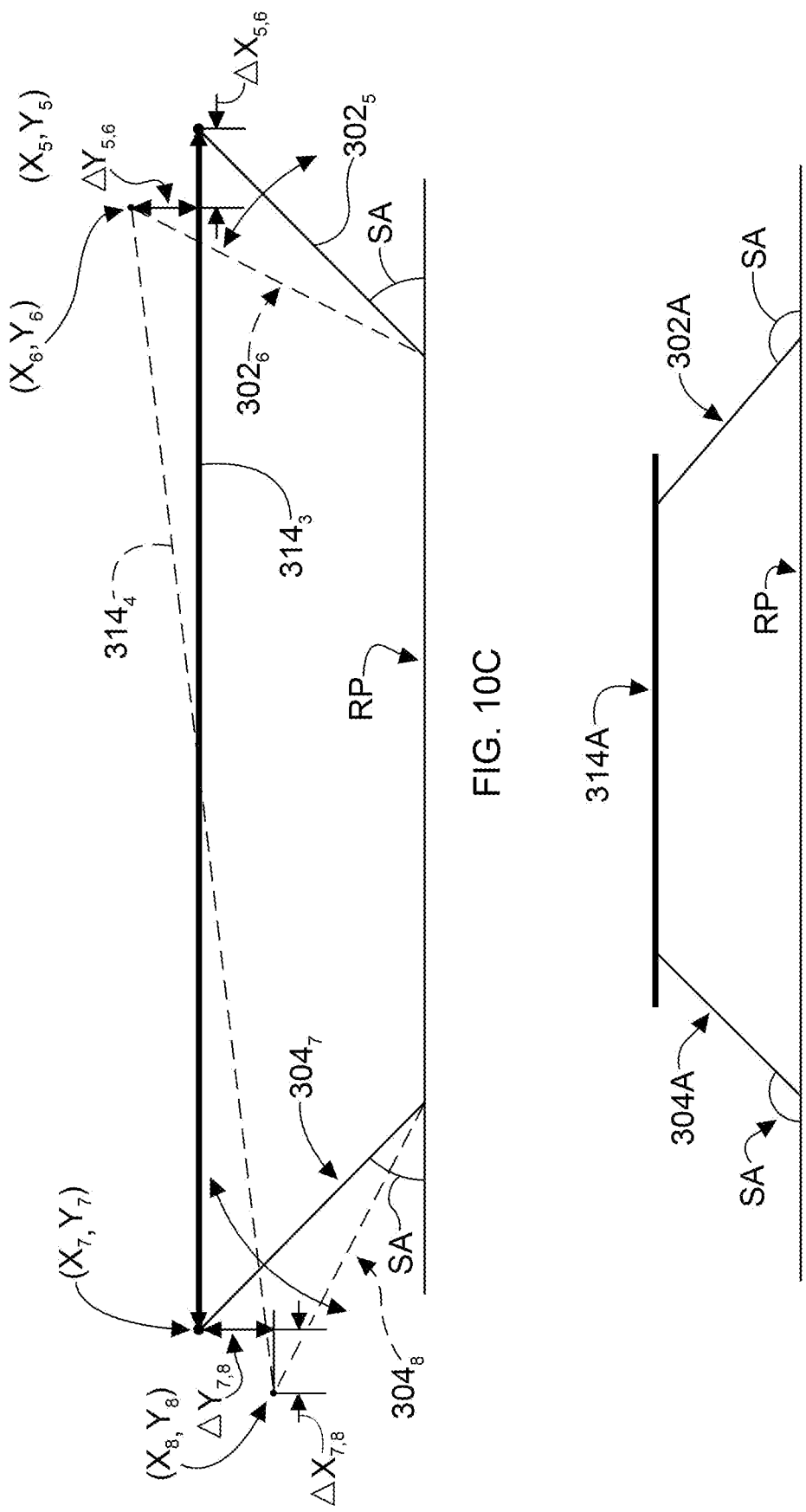
FIG. 10C is a schematic top plan view of another optional configuration of certain structural components of the frame assembly of FIG. 5 illustrating a different, incremental racking movement
FIG. 10D is schematic top plan view of yet another optional configuration of certain structural components of the frame assembly of FIG. 5.

FIGS. 10B and 10C illustrate how maintaining the longitudinal struts 302, 304 in a nonparallel orientation provides enhanced racking resistance. FIG. 10B schematically illustrates, in a schematic top plan view, an optional orientation in which the longitudinal struts 302 and 304 are oriented in a parallel configuration, e.g., in which they are not "splayed", in other words, the longitudinal struts 302 and 304 are generally perpendicular to a reference plane RP. As such, in the configuration illustrated in FIG. 10B, the longitudinal axes LA of the longitudinal struts 302 and 304 are parallel. Thus, initial positions of the longitudinal struts 302, 304 are identified as initial positions $302_1$ and $304_1$. In this configuration, the longitudinal struts 302 and 304 are bowed and are generally perpendicular to the reference plane RP. In this hypothetical, the reference plane RP can be considered approximately parallel with the user's back in use.

In the initial positions $302_1$, $304_1$, the middle portion of the longitudinal strut 302, i.e., the portion attached to middle lateral frame member 314, is identified as initial position with coordinates $(X_1, Y_1)$. Similarly, the initial position $304_1$ is identified with the coordinates $(X_3, Y_3)$. In this position, the initial position of the middle lateral frame member 314 is identified initial position $314_1$.

An incremental movement towards the left (as viewed in FIG. 10B), of the middle lateral frame member 314 could be caused by a lateral load onto the frame assembly 214.

Displaced positions of the longitudinal struts 302, 304, and middle lateral frame member 314 are identified as displaced positions $302_2$, $304_2$, $314_2$. Thus, the displaced positions of the middle portions of the longitudinal struts 302, 304 are identified with displaced coordinates, specifically, the displaced position $302_2$, is displaced to coordinates $(X_2, Y_2)$. Similarly, the displaced position $304_2$ is displaced to coordinates $(X_4, Y_4)$.

The component changes in positions of the middle portions of the longitudinal struts 302, 304 are thus can be identified as $\Delta X_{3,2}$ and $\Delta X_{3,2}$. Similarly, the change in position of the middle portion of longitudinal strut 304 can be identified as $\Delta X_{3,4}$, $\Delta X_{3,4}$. In this example, $\Delta X_{3,2}$ equals $\Delta X_{3,4}$ and $\Delta Y_{302}$ equals $\Delta X_{304}$. Thus, the distance between the middle portions of the longitudinal struts 302, 304 does not change thus the middle lateral frame member 314 does not itself provide resistance against a racking motion. In other words, the longitudinal struts 302, 304 can be pivoted about the pivot axes PA, while remaining attached to the middle lateral frame member 314 and thus generally move to side to side and remain in a parallel orientation. Resistance against such a racking movement could be provided by stiff connections between the longitudinal struts 302, 304 with the middle lateral frame member 314 and/or at the upper and lower ends of the longitudinal struts 302, 304. However, such connectors would require higher strength or stiffness in order to provide the torsional rigidity sufficient to provide substantial racking resistance.

FIG. 10C, by contrast, illustrates a schematic top plan view of an orientation in which the longitudinal struts 302, 304 are nonparallel, and more specifically in this embodiment, "splayed apart." In the illustrated embodiment, the longitudinal struts 302, 304 are oriented at splayed angle SA relative to the reference plane RP. For purposes of simplified mathematics, the splay angle SA can be assumed to be approximately 45 degrees in the illustrated embodiment. The initial position of the longitudinal struts 302, 304 are identified as initial positions $302_3$, $304_3$. In this orientation, the initial position of the initial position $302_3$ is identified as with coordinates $(X_5, Y_5)$ and the incrementally deflected position, identified as deflected position $302_4$, has the coordinates $(X_6, Y_6)$. Similarly, the initial position of longitudinal strut 304 is identified as initial position $304_3$ with the middle portion having an initial coordinates $(X_7, Y_7)$ and the deflected position identified as deflected position $304_4$ with the middle portion having the position $(X_8, Y_8)$.

With an incremental movement from the initial positions $302_3$, $304_3$ and with a splay angle of 45 degrees, the changes in the X, Y coordinates from the initial positions to the deflected positions are approximately equal in FIG. 10C, because the splay angle SA is 45 degrees. The change from the original to the deflected positions of the longitudinal strut 302 can be represented as $\Delta X_{5,6}$ and $\Delta Y_{5,6}$. Similarly, the change in coordinates of the middle portion of the longitudinal strut 304 can be identified as $\Delta X_{7,8}$ and $\Delta Y_{7,8}$.

In this hypothetical, the incremental movement in the initial positions $302_3$, $304_3$ to the deflected positions $302_4$, $304_4$ results in $\Delta X_{5,6}$ being equal to $\Delta X_{7,8}$. The magnitude of the change in the Y coordinate equal, but are opposite.

In other words, $\Delta Y_{5,6}$ equals negative $\Delta Y_{7,8}$. Thus, in the incremental movement described above, the distance between the middle portions of the longitudinal struts 302, 304 grows larger. Thus, a fixed-length connection between the middle portions of the longitudinal struts 302, 304, for example, with the middle lateral frame member 314, would resist a racking movement as racking movements would tend to create tension in the middle lateral frame member 314.

Thus, in some embodiments, the middle lateral frame member 314 can be connected to the middle portions of the longitudinal struts 302, 304 with connectors that can provide a substantially fixed distance between the middle portions thereof. Various different kinds of connectors can be used and can include some play and/or elasticity while still providing useful and/or improved racking resistance. Additionally, the splay angle SA can have magnitudes other than 45 degrees. For example, the racking resistance provided by the splayed apart orientation of the longitudinal struts 302, 304 is achieved somewhat proportionally to the magnitude of the difference between the splay angle SA and 90 degrees. For example, splay angles SA of 85 degrees or less can provide beneficial racking resistance. Stated another way, where the splay angle SA is about 85 degrees or less, the longitudinal struts 302, 304 would be angled away from each other by about 10 degrees or more, relative to one another. In some embodiments, the middle lateral frame member 314 is connected so as to maintain the middle portions of the longitudinal struts 302, 304 so as to be angled away from each other by about 20 degrees or more. However, other angles can also be used, for example, 30 degrees or more, 45 degrees or more, 50 degrees or more, 55 degrees or more, or at any other angle therebetween and including angles up to approximately 180 degrees.

FIG. 10D illustrates another embodiment in which the crossbar strut 314A can be connected to the struts 302A, 304A so as to maintain the middle portions of the struts 302A, 304A spaced more closely together, for example, resulting in splay angles SA that are equal to or greater than about 95 degrees. In such embodiments, the struts 302A, 304A can be considered as being splayed inwardly.

As noted above, different types of connectors can be used for connecting the individual structural components of the frame assembly 214 to each other and to the carrying harness 204.

In some embodiments, optional configurations of the longitudinal struts 302,304 can provide further, optional benefits in response to torsional loads. FIGS. 10E-10K schematically illustrate some deflections of certain structural components during tor As described herein, torsional loading of the frame system can be considered as a twisting load about a vertical axis. FIG. 10E identifies the vertical axis as the Y-axis, which would be vertical when in normal use by a user, the X-axis extends laterally relative to the frame assembly 214 or a left-right direction when in normal use by a user, and the Z-axis extends generally in a front-back direction when in normal use by a user.

With reference to FIG. 10E, during use, the backpack and frame system 110 can be subject to torsional loading. For example, but without limitation, when a user is wearing the backpack and frame system 110 and walking, the user's upper-body and shoulders can twist, side-to-side, relative to their hips. Such a movement can cause the backpack and frame system 110 to twist about a vertical axis V, such that the upper portion of the frame assembly 214 pivots about the V axis in a twisting direction T. Additionally, any loads supported by the frame assembly 214 can also contribute to such torsional loading. FIG. 10E includes phantom line representations of the top lateral frame member 310 and the middle lateral frame member 314 in deflected positions that may be caused during torsional loading causing a twist in the twisting direction T. The longitudinal struts 302, 304 would also be deflected, although such deflection is not illustrated in FIG. 10E.

If the longitudinal struts 302,304 were parallel (i.e., not splayed inwardly or outwardly, or where both splay angles SA are 90 degrees), twisting or torsion of the frame assembly 214 only displaces the ends of the longitudinal struts in a co-planar fashion in the z-dimension.

However, in embodiments where the longitudinal struts 302,304 are non-parallel, e.g., splayed apart in the z-dimension (as shown in FIGS. 9 and 10A), twisting or torsion of the frame assembly 214 displaces the ends of the longitudinal struts in an opposing and non-coplanar fashion. For example, if the longitudinal struts with their respective tension elements 306,308 are each viewed as basically a planar beam, displacement of the ends in opposite directions creates a twisting or torsional moment in the strut/beam arrangement themselves, which then reacts with a countermoment which will tend to restore the strut/beam to its stable, planar form. FIG. 10F shows an in-plane view of a splayed longitudinal strut/beam arrangement (longitudinal strut 302 is aligned with strap 306 and longitudinal strut 304 is aligned with strap 308) with no torsional moment applied. FIG. 10G shows the same view of the same strut/beam arrangement in a torsionally-stressed condition.

The same non-coplanar displacement of the ends of the longitudinal struts 302,304 due to torsional moment (e.g., in the twisting direction T) of the frame can alter the geometry of the struts 302,304 and straps 306,308 in an advantageous way.

For example, the twisting of the strut/beam arrangement described above serves to lever the ends of the longitudinal struts 302, 304, with the top and bottom lateral frame members 310, 312 as fulcra, in such a way that the line of the straps 306, 308 bend at the top and bottom lateral frame members 310, 312.

FIG. 10H is simplified schematic diagrams of a strut arrangement with no torsional moment applied and FIG. 10I is an enlarged schematic diagram showing the alignment of the straps 306, 308 with the ends of the longitudinal struts 302, 304, wherein the illustrated alignment exists for both the upper and lower ends of the longitudinal struts 302, 304, which are adjacent to the top and bottom lateral frame members 310, 312.

FIGS. 10J and 10K are the same schematic views as FIGS. 10H and 10I, with the frame assembly 214 under a torsional load. As shown in FIGS. 10J and 10K, the twisting of the strut/beam, which changes its incident angle, produces an angular shift Θ of the ends of the tension members 306,308. This angular shift, as generalized in FIG. 10K, effectively shortens the effective length of the straps 306, 308, thereby further bending the longitudinal struts 302,304. Thus, the longitudinal struts 302,304 can act as springs providing a restorative force that opposes torsional deflections.

FIGS. 11A-11C are side elevation, perspective and rear elevation schematic views of the collapsible and deployable backpack and frame system 110 of FIG. 1 in a deployed condition for describing additional, optional features in accordance with an embodiment. As shown in FIGS. 11A-11C, the system 110 can optionally include top snap connectors 1102 and 1104 and bottom snap connectors 1106 and 1108 provided on each of the straps 306 and 308 of the carrying harness 204. For example, the top snap connectors 1102, 1104 and the bottom snap connectors 1106, 1108 include connector members including socket portions configured to receive upper and lower end portions of the longitudinal struts 302, 304, respectively, with a snap fit, interference fit, or another design configured to capture the end portions of the longitudinal struts 302, 304. The illustrated snap connectors are conventional and are commercially available as an accessory for tents and tent poles, referred to as "pole clips," "ball caps," and "Jake's foot" from DAC. Other types of connectors can also be used as the snap connectors 1102, 1104, 1106, and 1108.

Optionally, the harness can be made of webbing with the two parallel primary sections or straps 306 and 308 of adjustable length, at the top and bottom of which are secured the ends of the longitudinal struts 302 and 304 via respective snap connectors 1102, 1104, 1106 and 1108, and which engage spherical ball ends 1110 of the longitudinal struts 302 and 304. The straps 306 and 308 are joined by several transverse lengths 1112, which define the width of the carrying harness 204, and an x-brace arrangement 1114 to prevent racking to securely hold the ball ends 1110 of the longitudinal struts 302 and 304.

Lower portions of each strap 306 and 308, can include a tube portion 1116 configured to restrain the recurved portions of the longitudinal struts 302 and 304 in the proper orientation. A pair of adjustable tensioners 1118 can be attached at the tops of the straps 306 and 308 on the load side, for example, to maintain a position of middle lateral frame member 314. The shoulder straps 206, 208 can be attached partway up on the non-load side of the straps 306, 308, with an additional adjustable section 1120 connected from the shoulder straps 206, 208 to the top of each of the straps 306, 308 to help control load position. Snap buckles 1122 can be provided near the bottom of the straps 306, 308 on either side thereof to attach the respective waist straps 210, 212 of the removable hip belt assembly 209.

Of the lateral frame members 218, the top lateral frame member 310 is at the top of the carrying harness 204, and the bottom lateral frame member 312, which can be curved and provided with foam padding 1124 at the bottom in the lumbar area of the carrying harness 204 for ergonomics. Optionally, the top and bottom lateral frame members 310, 312 can be configured to maintain some lateral tension in the carrying harness 204, so as to assist in maintaining a desired shape of the carrying harness 204. The longitudinal struts 302 and 304, optionally, can have detachable sections tethered by elastic (not shown). The longitudinal struts 302 and 304 can be straight when unloaded, but optionally can include the short, curved portions 220 at the bottom thereof, and that are slipped through each tube portion 1116 and connected at the top and the bottom of each the respective straps 306 and 308.

The longitudinal struts 302 and 304 can be pulled into a bowed-shape by tightening and thereby shortening the effective lengths of the straps 306 and 308. The recurved portions of the longitudinal struts 302 and 304 prevent the frame assembly 214 from digging into the body of the user at its lower end.

The middle lateral frame member 314 can be inserted into sleeves 1126, which can be moveable and can be made from webbing, on each of the longitudinal struts 302 and 304, which can be configured to maintain the middle portions of struts 302 and 304 in a position spaced further apart than the spacing of the upper and lower ends of the longitudinal struts 302 and 304. Advantageously, the bowing lends rigidity to the frame assembly 214, by pre-loading the top and bottom lateral frame members 310 and 312 connections at the upper and lower corners of the carrying harness 204. The middle lateral frame member 314, by virtue of the sleeves 1126, can be moved over approximately the middle half of the length of the longitudinal struts 302 and 304.

FIGS. 12A-12C are side elevation, perspective and rear elevation schematic views of collapsible and deployable backpack and frame system 110 of FIG. 1 in a deployed condition and with pannier bags 106, 108 attached thereto for describing further features in accordance with an embodiment. In FIGS. 11A-11C, with the carrying harness 204 and the frame assembly 214 assembled, the two pannier bags 106 and 108 or pieces of luggage can be removed from the bicycle 102 and secured to the top lateral frame member 310 and the middle lateral frame member 314, respectively, in the same way that the pannier bag 106 or 108 connects to the carrier rack 104. Sliding rubber collars (not shown) provided on the top and middle lateral frame members 310, 314 can be adjusted to prevent lateral movement of the pannier bags 106 and 108.

The strap 316 connected to middle lateral frame member 314 can be looped around a suitable part (not shown) of the bottom of the first pannier bag 106 (e.g., the precise part varies from pannier manufacturer to manufacturer, arrangements differ). The middle lateral frame member 314 can be positioned lower than the bottom of the first pannier bag 106, so that the second pannier bag 108 can be secured to the middle lateral frame member 314, employing connectors 1202 that also secure the pannier bags 106 and 108 to the carrier rack 104, and with rubber collars (not shown) for lateral constraint. The strap 318 can be connected to the bottom lateral frame member 312, similarly, and connected to a point on the bottom (not shown) of the pannier bag 108. The adjustable tensioners 1118 connected to the middle lateral frame member 314 are tightened, drawing the second pannier bag 108 up firmly against the top pannier bag 106. Finally, the straps 316 and 318 looped around (not shown) the bottom of each of the pannier bags 106 and 108 are tightened, securing both of the pannier bags 106 and 108 in place.

The backpack system 110 can be worn and adjusted in various other manners, such as by way of adjustments typical in commercially available backpacks. Advantageously, a roll-top dry bag or other such pack and the like, can be secured to the carrying harness 204 and/or the frame assembly 214 in any suitable number of ways. The top and bottom lateral frame members 310 and 312 can also be fitted with the spherical ball ends 1110, advantageously, to which can be conveniently attached a number of useful accessories (not shown), such as an elastic cargo net, harnesses for specialty equipment (e.g., a fly-fishing rod case), and the like.

While several embodiments are presented in the foregoing detailed description, a vast number of variations exist. The embodiments described herein are not intended to limit the scope, applicability, or configuration of the claimed subject matter in any way. Rather, the foregoing detailed description provides those skilled in the art with a convenient road map for implementing the described embodiments. Various changes can be made in the function and arrangement of elements without departing from the scope defined by the claims, which includes known equivalents and foreseeable equivalents at the time of filing this patent application.

What is claimed is:

1. A collapsible and deployable pannier bag system for carrying bicycle-mountable pannier bags with a collapsible backpack for supporting the pannier bags on a user, the pannier bag system comprising:

a bicycle having a suspension portion having an overall suspension portion width, and a carrier rack including a first side portion and a second side portion, the carrier rack straddling the suspension portion;

a first pannier bag and a second pannier bag removably attached to the first side portion and the second side portion, respectively; and a collapsible and deployable backpack removably attached to the carrier rack, the collapsible and deployable backpack, including:

a first longitudinal frame strut, the first longitudinal frame strut comprising a first upper portion, a first upper end, a first lower portion, a first lower end, a first middle portion positioned between the first upper end and the first lower end, and a first longitudinal axis extending from the first upper end to the first lower end, a second longitudinal frame strut comprising a second upper portion, a second upper end, a second lower portion, a second lower end, and a second middle portion positioned between the second upper end and the second lower end, and a second longitudinal axis extending from the second upper end to the second lower end, at least a top lateral frame strut, a middle lateral frame strut and a bottom lateral frame strut, a carrying harness, including at least a first longitudinal strap and a second longitudinal strap, the first longitudinal strap having a first upper connector portion and a first lower connector portion, the second longitudinal strap having a second upper connector portion and a second lower connector portion, the first upper connector portion and the second upper connector portion configured to removably receive the first upper portion and the second upper portion, respectively, and the first lower connector portion and the second lower connector portion configured to receive the first lower portion and the second lower portion, respectively, the first longitudinal strap and the second longitudinal strap configured retain the first longitudinal frame strut and the second longitudinal frame strut, respectively, under stress in a bowed configuration, wherein the top lateral frame strut is configured to be removably connected to the first upper portion and the second upper portion, wherein the bottom lateral frame strut is configured to be removably connected to the first lower portion and the second lower portion, and wherein the middle lateral frame strut is configured to be removably connected to the first middle portion and the second middle portion so as to maintain the first longitudinal frame strut and the second longitudinal frame strut in a non-parallel, rotational orientations about the first longitudinal axis and the second longitudinal axis, respectively, differing by at least ten degrees such that the first middle portion and the second middle portion are spaced apart by a middle spacing that is greater than an upper spacing between the first upper portion and the second upper portion and greater than a lower spacing between the first lower portion and the second lower portion, so as to resist a racking movement of the first longitudinal frame strut and the second longitudinal frame strut, in use, wherein the top lateral frame strut and the middle frame strut are configured to removably receive the first pannier bag and the second pannier bag, respectively, a belt strap removably attached to a bottom portion of the first longitudinal strap and the second longitudinal strap, at least two adjustable shoulder straps respectively attached to the first longitudinal strap and the second longitudinal strap, and a carrying bag configured to store the carrying harness along with the first longitudinal frame strut, the second longitudinal frame strut, the top lateral frame strut, the bottom lateral frame strut, and the middle lateral frame strut arranged generally parallel to each other in a collapsed configuration inside the carrying bag such that an overall bag width of the carrying bag is less than the overall suspension portion width of the suspension portion.

2. The collapsible and deployable pannier bag system of claim 1, further comprising:

a first bottom securement strap having a first end removably attached to the middle lateral frame strut, and a second end removably attached to a bottom portion of the first pannier bag for securing the first pannier bag to the carrying harness; and a second bottom securement strap having a first end removably attached to the bottom lateral frame strut, and a second end removably attached to a bottom portion of the second pannier bag for securing the second pannier bag to the carrying harness.

3. The collapsible and deployable pannier bag system of claim 1, wherein the first longitudinal strap and the second longitudinal strap are configured to have an adjustable length such that an extent to which the first longitudinal frame strut and the second longitudinal frame strut are bowed can be adjusted.

4. The collapsible and deployable pannier bag system of claim 1, wherein the middle lateral frame strut is configured to maintain the first longitudinal frame strut and the second longitudinal frame strut in a non-parallel orientation so as to resist the racking movement under a lateral load.

5. A collapsible and deployable backpack for carrying two independent pieces of luggage, comprising:

a first longitudinal frame strut and a second longitudinal frame strut, an upper lateral frame strut, a middle lateral frame strut, a lower lateral frame strut, a carrying harness including a first longitudinal strap and a second longitudinal strap having an upper connector portion and a lower connector portion configured to removably receive respective upper and lower portions of the first longitudinal frame strut and the second longitudinal frame strut, the first longitudinal strap and the second longitudinal strap configured to maintain the first longitudinal frame strut and the second longitudinal frame strut in a bowed orientation, wherein the upper lateral frame strut is configured to be removably connected to respective upper portions of the first longitudinal frame strut and the second longitudinal frame strut and to support a first piece of luggage, wherein the lower lateral frame strut is configured to be removably connected to lower portions of the first longitudinal frame strut and the second longitudinal frame strut, and wherein the middle lateral frame strut is configured to be removably connected to middle portions of the first longitudinal frame strut and the second longitudinal frame strut and to support a second piece of luggage that is independent from the first piece of luggage, and at least two adjustable shoulder straps respectively attached to the first longitudinal strap and the second longitudinal strap.

6. The collapsible and deployable backpack according to claim 5, wherein the middle lateral frame strut is configured to maintain the first longitudinal frame strut and the second longitudinal frame strut in a non-parallel orientation so as to resist racking under a lateral load.

7. The collapsible and deployable backpack according to claim 5 additionally comprising a belt strap removably attached to a bottom portion of the first longitudinal strap and the second longitudinal strap.

8. The collapsible and deployable backpack according to claim 5 additionally comprising a carrying bag configured to store the first longitudinal frame strut, the second longitudinal frame strut, the upper lateral frame strut, the middle lateral frame strut, and the lower lateral frame strut and the carrying harness.

9. The collapsible and deployable backpack according to claim 5, in combination with a bicycle having a carrier rack and with the first piece of luggage and the second piece of luggage removably connectable to the carrier rack, wherein the first piece of luggage and the second piece of luggage are also removably connectable to a frame of the bicycle.

10. The collapsible and deployable backpack according to claim 9, additionally comprising:

a first bottom securement strap having a first end removably attached to the middle lateral frame strut, and a second end removably attached to a bottom portion of the first piece of luggage for securing the first piece of luggage to the carrying harness; and a second bottom securement strap having a first end removably attached to the lower lateral frame strut, and a second end removably attached to a bottom portion of the second piece of luggage for securing the second piece of luggage to the carrying harness.

11. The collapsible and deployable backpack according to claim 5, wherein the middle lateral frame strut is configured to maintain the first longitudinal frame strut and the second longitudinal frame strut in an orientation tilted away from each other by at least 10 degrees.

* * * * *